United States Patent
Lobscheid

(10) Patent No.: US 9,897,308 B2
(45) Date of Patent: Feb. 20, 2018

(54) STEAM GENERATOR WITH TUBE ALIGNING ORIFICE

(71) Applicant: NuScale Power, LLC, Corvallis, OR (US)

(72) Inventor: Christian Lobscheid, Corvallis, OR (US)

(73) Assignee: NUSCALE POWER, LLC, Corvallis, OR (US)

( * ) Notice: Subject to any disclaimer, the term of this patent is extended or adjusted under 35 U.S.C. 154(b) by 814 days.

(21) Appl. No.: 14/254,729

(22) Filed: Apr. 16, 2014

(65) Prior Publication Data

US 2015/0184845 A1    Jul. 2, 2015

Related U.S. Application Data

(60) Provisional application No. 61/921,027, filed on Dec. 26, 2013.

(51) Int. Cl.
| | |
|---|---|
| *F28F 13/12* | (2006.01) |
| *F22B 1/18* | (2006.01) |

(Continued)

(52) U.S. Cl.
CPC ............ *F22B 1/1838* (2013.01); *B23P 15/26* (2013.01); *F22B 37/18* (2013.01); *F22B 37/74* (2013.01); *Y10T 29/4935* (2015.01)

(58) Field of Classification Search
CPC ........ F22B 1/1838; F22B 37/74; F22B 37/18; B23P 15/26; Y10T 29/4935

(Continued)

(56) References Cited

U.S. PATENT DOCUMENTS

| | | | | |
|---|---|---|---|---|
| 2,185,929 A | * | 1/1940 | Crowley, Jr. ............ | B01J 8/067 165/104.16 |
| 2,537,678 A | * | 1/1951 | Koetting ................. | F16L 41/10 165/157 |

(Continued)

FOREIGN PATENT DOCUMENTS

| | | |
|---|---|---|
| CH | 527390 A | 8/1972 |
| DE | 2262150 A1 | 7/1974 |

(Continued)

OTHER PUBLICATIONS

Vladimir B. Khabensky, Vladimir A. Gerliga, Coolant Flow Instabilities in Power Equipment, CRC Press, Chapter 3, Simplified Correlations for Determining the Two-Phase Flow Thermal-Hydraulic Oscillatory Stability Boundary, pp. 73-79, US/London.

(Continued)

*Primary Examiner* — Claire Rojohn, III
(74) *Attorney, Agent, or Firm* — Schwabe Williamson & Wyatt

(57) ABSTRACT

A heat transfer system includes a plenum configured to provide a secondary side fluid such as feedwater to a plurality of heat transfer tubes from a primary side fluid, and a tube sheet coupled to the plurality of heat transfer tubes. An orifice plate is mounted within the plenum and located adjacent to the tube sheet, and one or more orifice devices are supported by the orifice plate and are configured for insertion into or sealing against the plurality of heat transfer tubes. The one or more orifice devices may include center flow orifices, and/or rectangular or helical shaped transition stepped annular flow orifices, and an insertion of a number of the transition steps into the plurality of heat transfer tubes may determine a corresponding pressure drop of the secondary side fluid in the heat transfer system.

8 Claims, 19 Drawing Sheets

(51) Int. Cl.
*B23P 15/26* (2006.01)
*F22B 37/18* (2006.01)
*F22B 37/74* (2006.01)

(58) Field of Classification Search
USPC .............................................. 165/109.1, 184
See application file for complete search history.

(56) References Cited

U.S. PATENT DOCUMENTS

| | | | | |
|---|---|---|---|---|
| 5,011,652 | A * | 4/1991 | Tominaga | G21C 15/18 |
| | | | | 376/282 |
| 8,687,759 | B2 * | 4/2014 | Reyes, Jr. | G21C 9/012 |
| | | | | 376/347 |
| 8,752,510 | B2 | 6/2014 | Lin | |
| 9,275,761 | B2 * | 3/2016 | Cronje | G21C 1/322 |
| 9,406,409 | B2 * | 8/2016 | Reyes, Jr. | G21C 19/07 |
| 2005/0069079 | A1 * | 3/2005 | Boardman | G21O 5/10 |
| | | | | 376/347 |
| 2009/0129530 | A1 * | 5/2009 | Reyes, Jr. | G21C 1/32 |
| | | | | 376/282 |
| 2009/0129531 | A1 | 5/2009 | Reyes, Jr. | |
| 2009/0161812 | A1 * | 6/2009 | Reyes, Jr. | G21C 9/012 |
| | | | | 376/277 |
| 2009/0260584 | A1 | 10/2009 | Watakable | |
| 2011/0120688 | A1 * | 5/2011 | Kadah | B21D 39/046 |
| | | | | 165/182 |
| 2011/0247793 | A1 * | 10/2011 | Schoubye | F28F 1/40 |
| | | | | 165/177 |
| 2012/0111287 | A1 * | 5/2012 | Williams | F22B 29/064 |
| | | | | 122/32 |
| 2012/0160465 | A1 * | 6/2012 | Webb | F28D 1/0477 |
| | | | | 165/173 |
| 2013/0276943 | A1 | 10/2013 | Groome et al. | |
| 2013/0279643 | A1 | 10/2013 | O'Connor | |
| 2015/0129193 | A1 * | 5/2015 | Gallarda | B01J 8/062 |
| | | | | 165/276 |

FOREIGN PATENT DOCUMENTS

| | | | | |
|---|---|---|---|---|
| DE | 3533219 C1 | 11/1986 | | |
| WO | 2011/003140 A1 | 1/2011 | | |
| WO | WO 2011003140 A1 * | 1/2011 | .............. | F22B 37/18 |
| WO | WO 2013182392 A1 * | 12/2013 | .............. | B01J 8/062 |

OTHER PUBLICATIONS

R.D. Klake, H. Krecht, Investigation on the Nuclear Steam Generator of NS Otto Hahn, 1979, pp. 1-33, Germany.
M. El-Nagdy, A.D. Papa, Design and Performance of the Helically Coiled Boilers of Two AGR Power Stations in the United Kingdom, 1988, pp. 39-48, London.
M.H. Weber, THTR—Steam Generator Flow Stability, 1988, pp. 200-203, Switzerland.
Davide Papini et al., Proceedings of ICAPP 2011, Experimental Characterization of Two-Phase Flow Instability Thresholds in Helically Coiled Parallel Channels, May 2-5, 2011, Nice France.
Han-Ok Kang, et al., Structural Integrity Confirmation of a nce-through Steam Generator from the Viewpoint of Flow Instability, Journal of Nuclear Science and Technology (2007), 44:1, pp. 64-72.
International Preliminary Report on Patentability for PCT/US2014/061145; dated Jul. 7, 2016; 10 pages.
International Search Report and Written Opinion for PCT/US2014/061145; dated Jul. 6, 2015; 16 pages.

* cited by examiner

STEAM GENERATOR WITH TUBE ALIGNING ORIFICE

STATEMENT OF RELATED MATTER

This application claims priority to U.S. Provisional Application No. 61/921,027, filed on Dec. 26, 2013, which is incorporated by reference in its entirety.

TECHNICAL FIELD

This application relates to the field of power generation, including heat transfer systems designed to generate steam and/or electricity.

BACKGROUND

Power plants come in a variety of different designs and sizes. Larger sized power plants may be used to provide electricity to a large geographic area, whereas relatively small power plants may be used to power local areas or manufacturing facilities. In addition to providing electricity, power plants may be used for a myriad of additional or different purposes, from desalinating sea water to creating nuclear isotopes for medical purposes. Similarly, the types of power plants that are available cover a wide spectrum of technologies including gas powered, coal fired, and various types of nuclear power, to name a few.

One common feature between many of these power plants is the production of energy in the form of heat. The heat that is produced may ultimately be used to convert water into steam. When the production of electricity is the desired goal, the steam may be used to run a turbine. Regardless of the source of the heat, a heat transfer system may be used to transfer the heat generated by the power plant to the water that may then be converted to steam. A heat exchanger comprising a number of tubes may be used to exchange the heat between a primary coolant circulating through a reactor core and a secondary coolant that is converted into the steam. In some systems, the same coolant that is heated by the reactor core may be circulated through the tubes.

The tubes may be friction or pressure-fit to a tube sheet by roll-expanding a portion of the tubes within the tube sheet using a mechanical, pneumatic, or hydraulic device to provide a leak tight joint. The tubes may also be welded to the tube sheet. For tubes with secondary coolant boiling inside of the tubes, orifice or flow restriction devices may be provided at the secondary coolant (feedwater) inlet in order to attain secondary flow stability. The orifice device may be welded to the end of the tubes, such as at the inlet. Welded mounting techniques may make it difficult to inspect the tubes after installation. Additionally, one or more of the large number of orifice devices of the heat transfer system may become misaligned during installation, maintenance, inspection and/or operation of the power plant, resulting in an impediment to the flow of coolant through the tubes, an unacceptable amount of bypass leakage, pressure drop, and/or other alignment complications.

The present application addresses these and other problems.

SUMMARY

Figure 1:
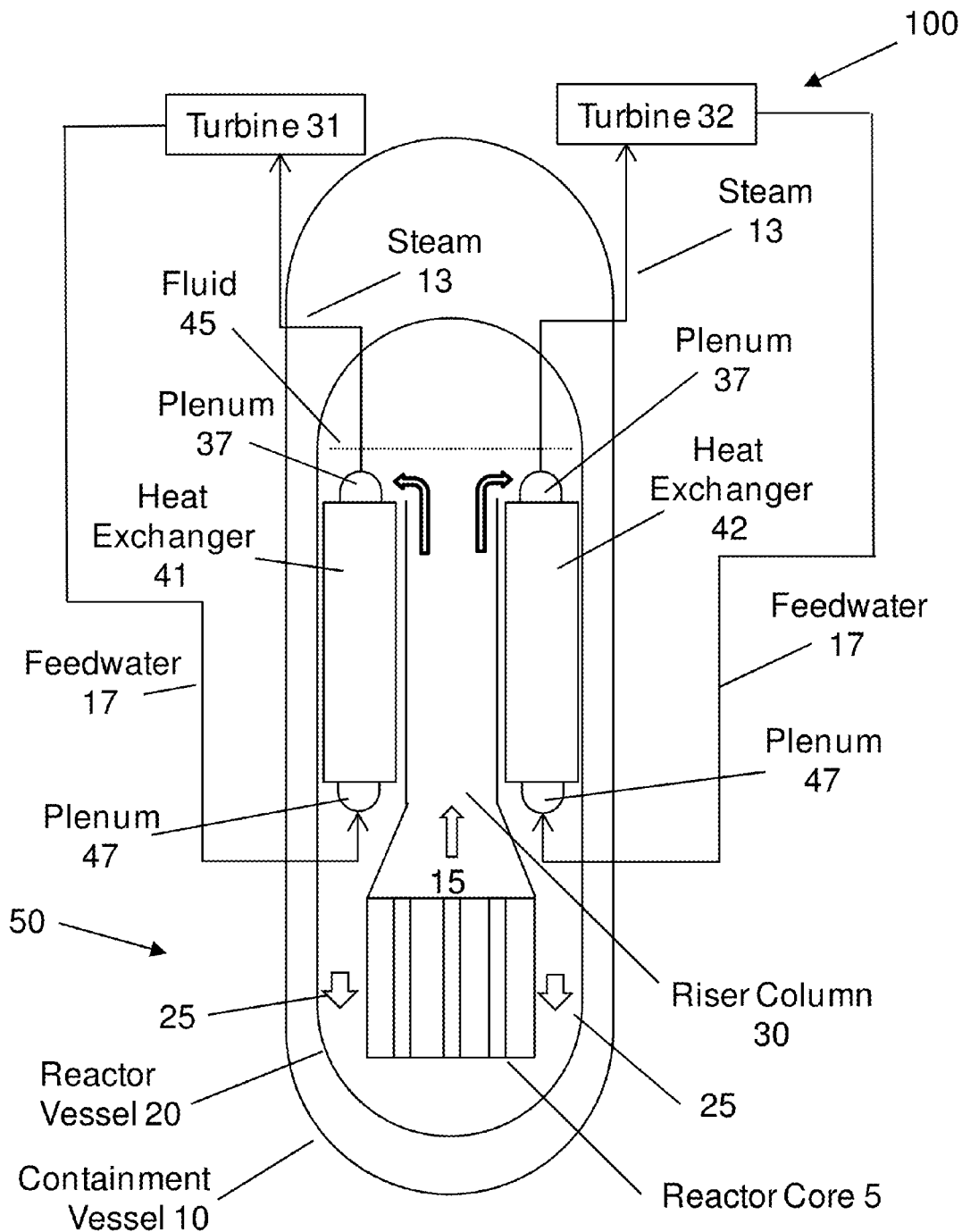
FIG. 1 illustrates an example steam generation system.

An example tube aligning orifice system is herein disclosed as comprising a plenum configured to provide secondary coolant and/or feedwater to a plurality of heat transfer tubes, and a tube sheet coupled to the plurality of heat transfer tubes. An orifice plate may be mounted within the plenum and located adjacent to the tube sheet, and one or more orifice devices may be supported by the orifice plate and configured for insertion into the plurality of heat transfer tubes. The one or more orifice devices may include helical shaped transition steps, and an insertion depth of the helical shaped transition steps into the plurality of heat transfer tubes may determine a corresponding pressure drop of the feedwater in the heat transfer system.

An example apparatus is herein disclosed as comprising means for receiving a source of feedwater and means for fluidly coupling the means for receiving to a plurality of heat transfer tubes including a first heat transfer tube and a second heat transfer tube. The apparatus may further comprise orifice means for varying a pressure of the feedwater contained within the first heat transfer tube based, at least in part, on an insertion depth of the orifice means. The pressure of the feedwater in the first heat transfer tube may be varied by repositioning the orifice means relative to means for mounting until a flow rate and/or heat transfer rate associated with the first heat transfer tube approximately equals a flow rate and/or heat transfer rate associated with the second heat transfer tube.

An example method of installing a tube aligning orifice system is herein disclosed, and may comprise mounting an orifice plate adjacent to a tube sheet. A plurality of heat transfer tubes may be coupled to the tube sheet, and the plurality of heat transfer tubes may be configured to convey a fluid. A first orifice device attached to the orifice plate may be rotated, and a rotation of the first orifice device may result in a first insertion depth of the first orifice device within a first heat transfer tube. A pressure of the fluid in the first heat transfer tube may be determined based, at least in part, on the first insertion depth. Similarly, a second orifice device attached to the orifice plate may be rotated to a second insertion depth within a second heat transfer tube and a pressure of the fluid in the second heat transfer tube may be determined based, at least in part, on the second insertion depth. The second insertion depth may be greater than the first insertion depth. Varying the pressure of the fluid within the first heat transfer tube and the second heat transfer tube may result in an approximately uniform flow rate and/or approximately uniform heat transfer rate through the plurality of heat transfer tubes.

An understanding of the above examples of the application will become more readily apparent from the following detailed description with reference to the accompanying drawings.

DETAILED DESCRIPTION

Various examples disclosed or referred to herein may be operated consistent with, or in conjunction with, features found in one or more of U.S. application Ser. No. 11/941,024, U.S. application Ser. No. 12/939,957, and U.S. application Ser. No. 13/451,759, which are herein incorporated by reference in their entirety.

FIG. 1 illustrates an example steam generation system 100 configured for operation with a power module 50. Power module 50 may comprise a reactor core 5 positioned within a reactor vessel 20. In some examples, reactor core 5 may comprise a nuclear reactor and a number of control rods configured to control a rate of fission within reactor core 5. In other examples, power module 50 may be configured to operate as, or with, a gas powered power plant or a coal fired power plant.

A cylinder-shaped or capsule-shaped containment vessel 10 may surround reactor vessel 20. The volume, or containment space, between reactor vessel 20 and containment vessel 10 may be partially or completely evacuated to reduce heat transfer from reactor vessel 20 to the external environment. A partial vacuum outside reactor vessel 20 may be used to reduce the presence of flammable gasses in the containment space and/or to provide thermal insulation for reactor vessel 20. In other examples, the volume between reactor vessel 20 and containment vessel 10 may be at least partially filled with a gas and/or a fluid that may increase heat transfer between reactor vessel 20 and containment vessel 10.

Reactor vessel 20 may be configured to contain a fluid 45, such as water, which may include boron or other types of additives. In some examples, fluid 45 may comprise a primary coolant contained within reactor vessel 20 that is heated by reactor core 5 during operation of power module 50. An upward motion of the primary coolant, as represented by arrow 15, may result from the heating process such that the primary coolant travels upward through riser column 30 and past and/or through one or more heat exchangers of steam generation system 100, such as a first heat exchanger 41 and a second heat exchanger 42, due to forced convection and/or natural circulation. The one or more heat exchangers 41, 42 may be configured to extract heat from the primary coolant as the primary coolant travels down towards the bottom of reactor vessel 20, as represented by arrows 25. After reaching the bottom portion of reactor vessel 20, further contact with reactor core 5 may result in additional heating of the primary coolant and a continuation of the above cycle of the primary coolant past and/or through the one or more heat exchangers 41, 42.

Steam generation system 100 and/or the one or more heat exchangers 41, 42 may comprise a plurality of tubes arranged in a cylindrical shape. In some examples, the tubes may be arranged as a number of helical coils that wrap around an upper portion of riser column 30.

The primary coolant within reactor vessel 20 may be maintained at an above atmospheric pressure operating condition, thus allowing the primary coolant to maintain a high temperature without vaporizing (i.e. boiling). Steam generation system 100 may comprise a secondary coolant, such as water and/or feedwater. As the secondary coolant within the one or more heat exchangers 41, 42 increases in temperature due to the heat transferred from the primary coolant, the secondary coolant may begin to boil. As boiling commences, vaporized coolant or steam 13 may be routed from the one or more heat exchangers 41, 42 to drive one or more turbines 31, 32 that may be configured to convert the thermal potential energy of steam 13 into electrical energy. Steam generation system 100 may be configured to condense steam 13 and return feedwater 17 to the one or more heat exchangers 41, 42.

In some examples, such as in a pressurized reactor, steam 13 and feedwater 17 may comprise secondary coolant in steam generation system 100 that is kept isolated from fluid 45 circulating in the reactor vessel 20 as primary coolant, such that the secondary coolant and the primary coolant are not allowed to mix or come into direct contact with each other. In other examples, such as in a boiling water reactor, coolant within the reactor vessel may boil and create steam that is circulated through the steam generation system.

Steam generation system 100 may comprise one or more upper plenums 37 and one or more lower plenums 47. Lower plenums 47 may be located at input ports of the one or more heat exchangers 41, 42. In some examples, lower plenums 47 may include a tube sheet that is fluidly coupled to the heat transfer tubes. Upper plenums 37 may be located proximate with a first horizontal plane, such as plane 11A (FIG. 2), that intersects an upper portion of riser column 30. In some examples, one or more of upper plenums 37 may comprise a tube sheet that faces downward toward a second horizontal plane, such as plane 11B (FIG. 2), located below the first horizontal plane. Lower plenums 47 may be located proximate with the second horizontal plane that intersects a lower portion of riser column 30. In some examples, one or more of lower plenums 47 may comprise a tube sheet that faces upward toward the first horizontal plane.

Figure 2:
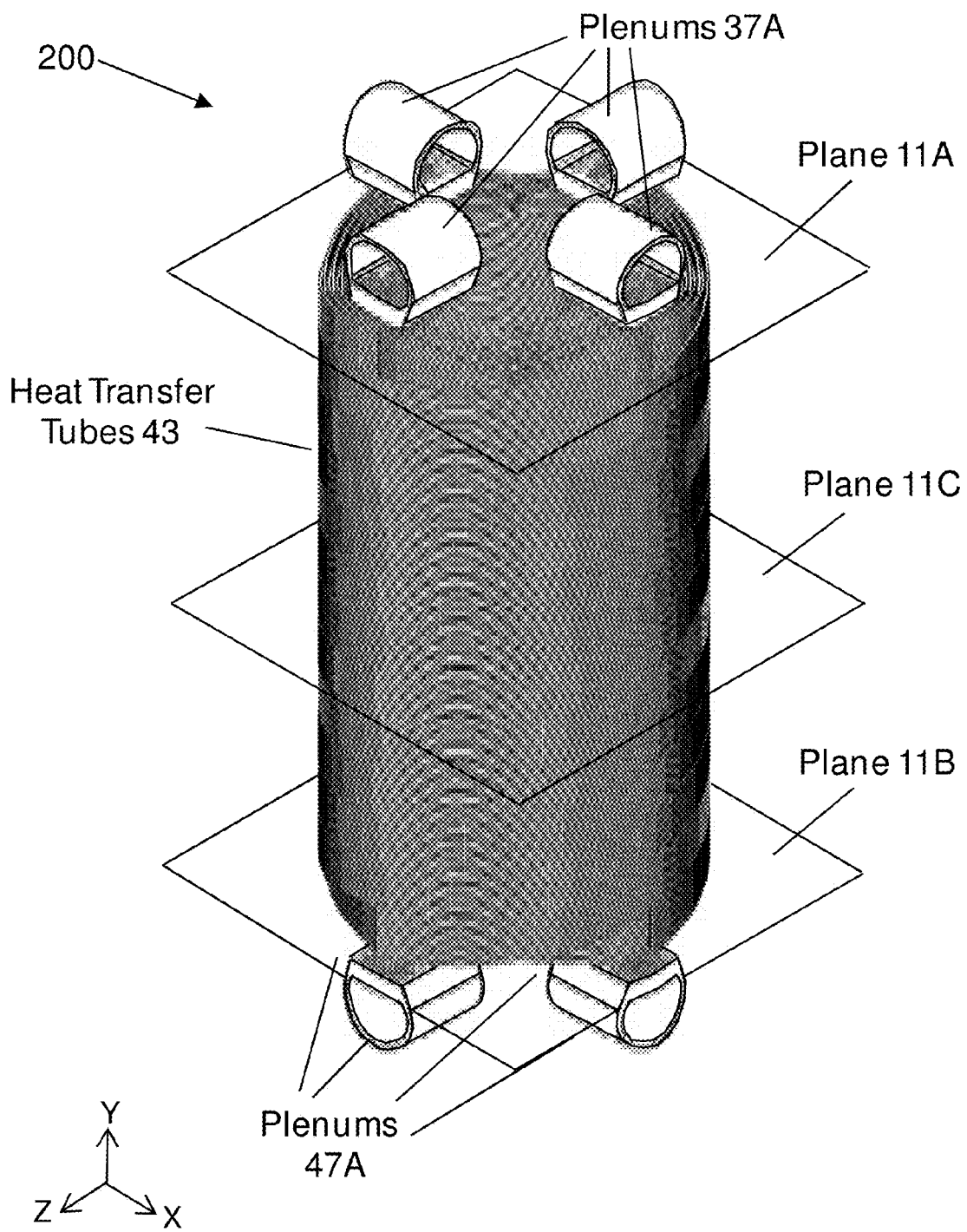
FIG. 2 illustrates an example steam generation system comprising heat transfer tubes operatively coupled to a number of plenums.

FIG. 2 illustrates an example steam generation system 200 comprising heat transfer tubes 43 operatively coupled to a number of plenums, such as lower plenums 47A and upper plenums 37A. Heat transfer tubes 43 may be configured as several layers of closely spaced tubes. In some examples, heat transfer tubes 43 may extend helically between lower plenums 47A and upper plenums 37A. Upper plenums 37A may be located in a first plane, such as first plane 11A, and lower plenums may be located in a second plane, such as second plane 11B. First plane 11A may be parallel with second plane 11B. One or both of lower plenums 47A and upper plenums 37A may be spaced at 90-degree intervals around steam generation system 200. Four upper plenums 37A are shown as being vertically aligned with four lower plenums 47A; however, in some examples, upper plenums 37A may be rotationally offset (e.g., by 45-degrees) from lower plenums 47A. Different numbers of plenums (e.g., two upper plenums and two lower plenums) and different degrees of offset (e.g., 90-degrees) are contemplated herein.

Figure 3:
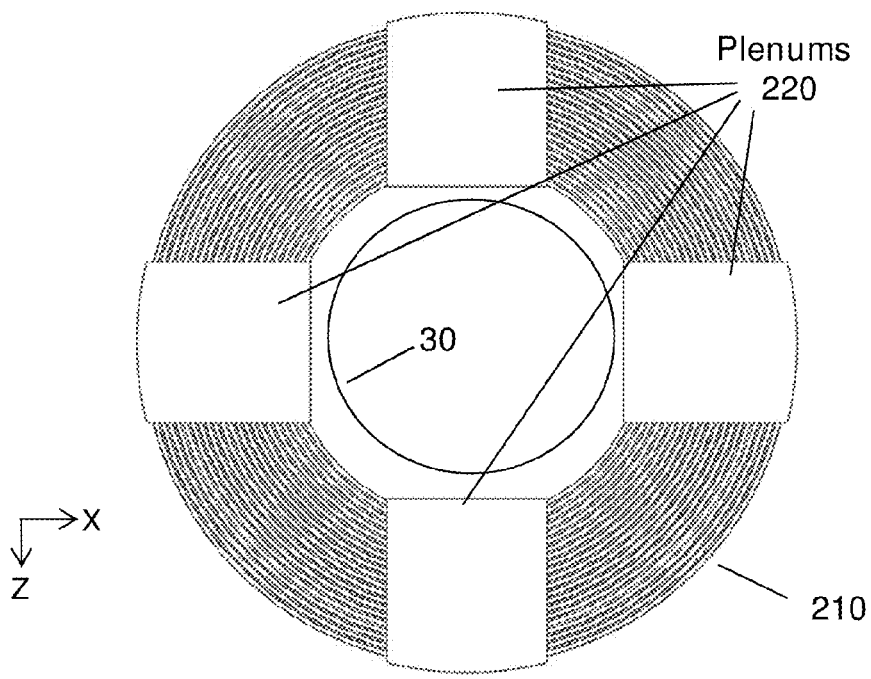
FIG. 3 illustrates an end view of an example steam generation system.

FIG. 3 illustrates an end view of an example steam generation system, such as steam generation system 200 of FIG. 2. Four plenums 220 are shown spaced at approximately 90-degree intervals about a central axis located perpendicular to an X-Z plane. The X-Z plane may correspond with, or be parallel to, one or more of planes 11A, 11B and 11C (FIG. 2). For example, a central axis (or y-axis, FIG. 2) may be taken with respect to a longitudinal centerline of a housing or a riser located above a reactor core, such as riser column 30 of FIG. 1. Concentric layers of heat transfer tubes 210 are shown surrounding riser 30.

One or more of heat transfer tubes 210 may originate in a lower plenum and/or terminate in an upper plenum. With respect to a helical heat transfer tube design, some of heat transfer tubes 210 may coil about riser 30 in a counterclockwise direction, whereas other tubes of heat transfer tubes 210 may coil about riser 30 in a clockwise direction. In some examples, consecutive layers of heat transfer tubes 210 may coil about the riser 30 in alternating and/or opposite directions.

Figure 4A:
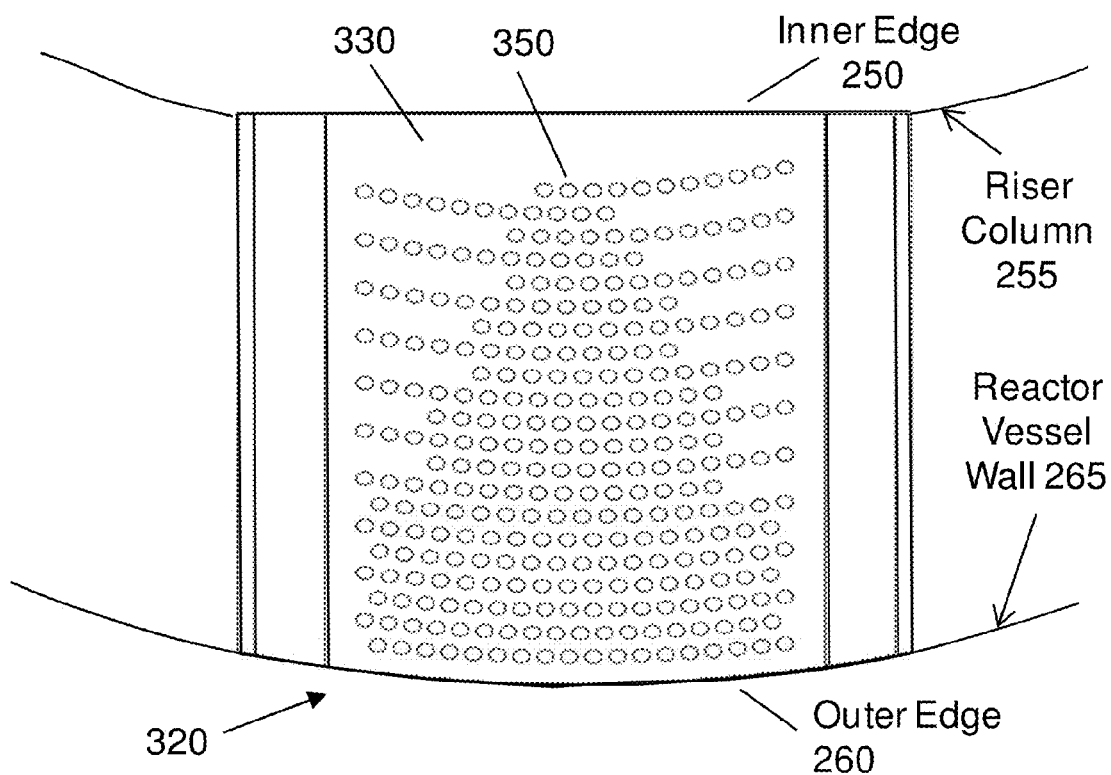
FIG. 4A illustrates a top view of an example plenum.

FIG. 4A illustrates a top view of an example plenum 320. Plenum 320 may comprise a tube sheet 330 having perforations 350 configured for coupling to individual tubes of a steam generator. Perforations 350 may be arranged in a variety of different configurations, such as concentric arcs and/or a series of rows on tube sheet 330. The rows may be arcuate or curvilinear in shape. In some examples, the rows may be substantially linear. The number of perforations 350 in each row may increase from a smaller number of perforations per row near or adjacent to an inner edge 250 of tube sheet 330 to a larger number of perforations per row near or adjacent to an outer edge 260 of tube sheet 330.

In some examples, a larger density of perforations (e.g., based on the number of perforations per unit area) may be present near or adjacent to outer edge 260 as compared to the density of perforations near or adjacent to inner edge 250. Inner edge 250 may correspond to a portion of plenum 320 adjacent to a riser column 255, and outer edge 260 may correspond to a portion of plenum 320 adjacent to a wall 265 of a reactor vessel, such as reactor vessel 20 of FIG. 1.

Figure 4B:
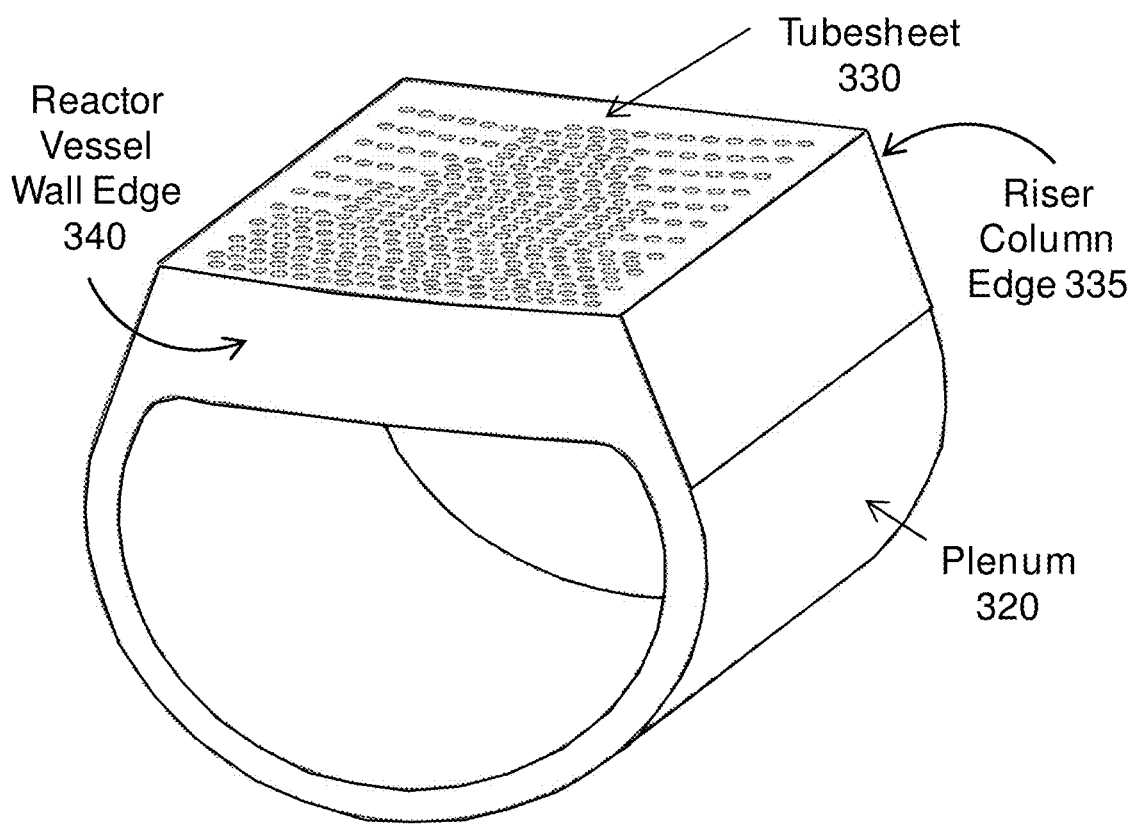
FIG. 4B illustrates an elevated front view of an example tube sheet associated with the plenum of FIG. 4A.

FIG. 4B illustrates an elevated front view of an example plenum and tube sheet, such as plenum 320 and tube sheet 330 of FIG. 4A. Tube sheet 330 may comprise a riser column edge 335 located on a side of plenum 320 closest to a riser column, such as riser column 30 (FIG. 1), and a reactor vessel wall edge 340 located on a side of plenum 320 closest to a reactor vessel, such as reactor vessel 20 (FIG. 1). In some examples, tube sheet 330 may comprise an approximately flat surface through which a plurality of perforations are formed. The perforations may be arranged as a plurality of rows and/or columns corresponding to a number of heat transfer tubes. The heat transfer tubes may also be arranged as a plurality of rows and/or columns, at least at the point of being coupled to tube sheet 330.

The number of rows and/or columns associated with tube sheet 330 may be considerably more than those shown in the simplified illustrations. In some examples a tube sheet may comprise twenty or more rows and/or columns of perforations with a corresponding number of heat transfer tubes.

Although tube sheet 330 is illustrated as having approximately parallel, opposing sides, some example tube sheets may comprise two or more non-parallel sides. The number of perforations located on one side of the tube sheet 330 may be less than the number of tubes on the opposite side allowing the tube sheet to be tapered. For example, an outer row of a tube sheet may comprise approximately twenty two perforations, whereas an inner row may comprise approximately seventeen perforations; although more or fewer perforations in any of the rows are contemplated herein. A tapered tube sheet may weigh less than a similarly sized tube sheet formed as a parallelogram.

In some examples, tube sheet 330 may be considered as being oriented in a generally horizontal plane. The perforations in tube sheet 330 may similarly be considered as generally facing upward, or downward, in a direction substantially perpendicular to the horizontal plane and/or in a direction substantially perpendicular to the surface/face of tube sheet 330. In some examples, the surface of tube sheet 330 may be approximately parallel to one or more horizontal planes, such as planes 11A, 11B and 11C of FIG. 2.

Other example tube sheets may be considered as being oriented in a generally vertical plane, such that the corresponding perforations would be considered as generally facing to the left hand side or the right hand side of a reactor vessel. In some examples, the surface of the tube sheet may be approximately perpendicular to one or more horizontal planes, such as planes 11A, 11B and 11C of FIG. 2.

Figure 5:
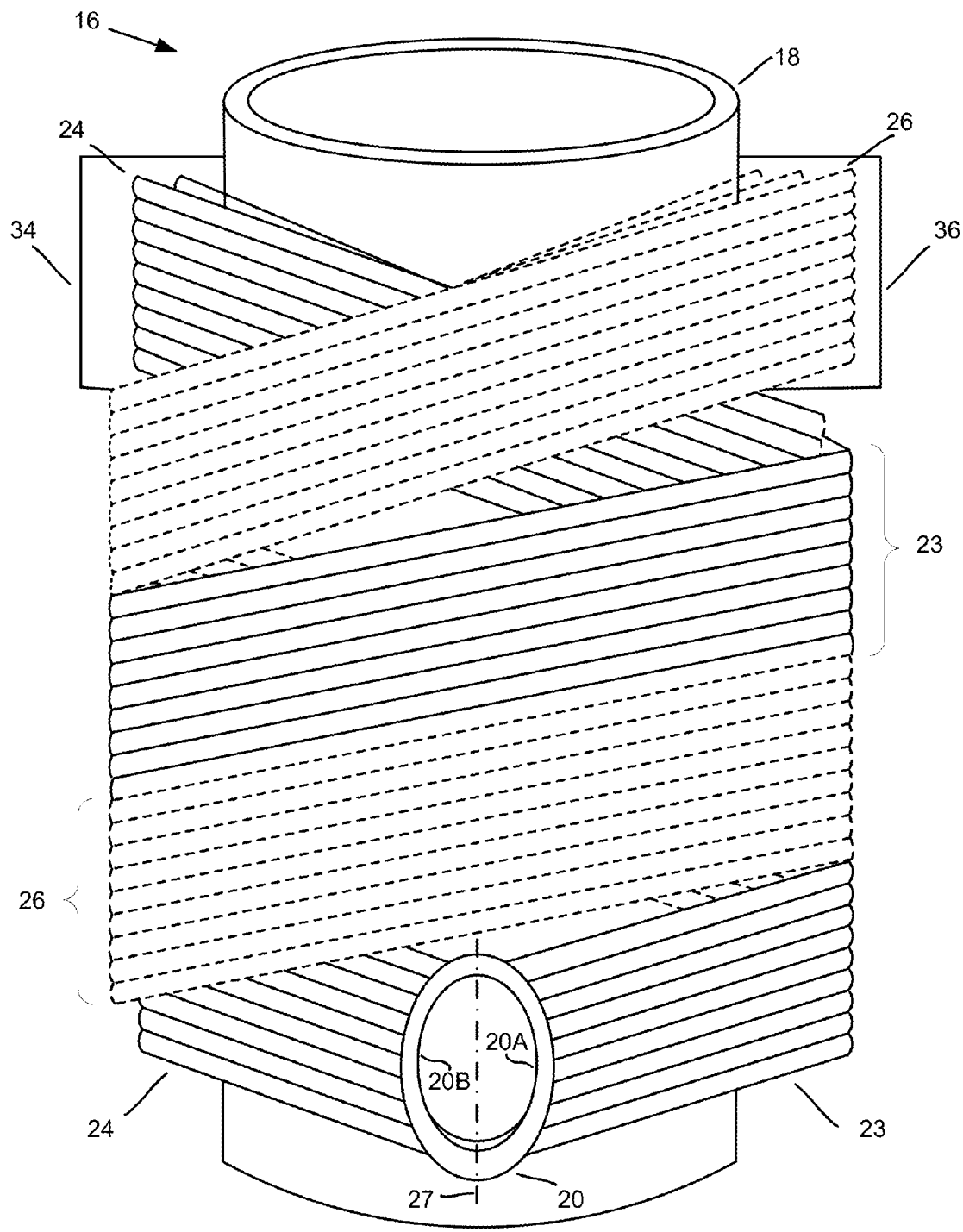
FIG. 5 illustrates a further example of a steam generation system.

FIG. 5 illustrates a further example of a steam generation system 16. Steam generation system 16 may comprise one or more steam generators and/or plenums. In some examples, one or more integral tube sheets/plenums (ITPs), such as lower ITPs 20, may be configured to receive feedwater, and one or more upper ITPs 34, 36 may be configured to transport steam to a turbine. The lower and upper ITPs may be mounted to a thermal housing 18, such as a riser, column, and/or annulus of a reactor vessel. Steam generation system 16 may be located within a pressure vessel, such as containment vessel 10 and/or reactor vessel 20 of FIG. 1. The ITPs may comprise one or more tube sheets. For example, a first tube sheet may be located on a first side of a plenum, and a second tube sheet may be located on a second side of the plenum.

The lower ITP 20 is illustrated as including a first side 20A and a second side 20B. In one example, first side 20A may comprise a first tube sheet, whereas second side 20B may comprise a second tube sheet. The lower ITP 20 may comprise an arcuate, circular, or elliptical shape. The lower ITP 20 includes a major axis 27 oriented in a vertical direction, wherein the first and second sides 20A and 20B are illustrated as being located on opposite sides of the major axis 27. In some examples, the one or more tubes sheets 20A, 20B may form an elliptical ITP. The first and second tube sets 23, 24 may be fluidly coupled to lower ITP 20 on opposite sides of the major axis 27. A second lower ITP (not shown) may be included on a second and opposite side of the housing 18 as the lower ITP 20. Similarly, the second lower ITP may also include first and second sides as described above.

A first set of heat transfer tubes 23 may be fluidly coupled to the first side 20A of lower ITP 20. A second set of heat transfer tubes 24 may be fluidly coupled to the second side 20B of the lower ITP 20 opposite the first set of heat transfer tubes 23. The plurality of tubes may be formed using varying numbers or rotations about the central axis to minimize the variation in the lengths of the tubes as the location of the tubes transitions from inside columns to outside columns.

The paths of the tubes may also be adjusted to help minimize the variations in the lengths of the tubes. The helical angles of the heat transfer tubes may vary to account for the different radial locations of the corresponding coils. Having tubes of substantially equal length may promote a constant pressure drop and equal fluid flow through each tube/set and also minimize the need to equalize pressure loss and/or flow redistribution. Additionally, configuring the tubes as coils may cause liquid to be thrown to the outside of the tubes and therefore into closer proximity to the surrounding super heated primary coolant which therefore may promote more efficient conversion of the feedwater into steam.

Primary coolant that passes through the reactor core 5 (FIG. 1) and up through the inside of housing 18 may circulate back down around the outside of housing 18, similar to that described with respect to FIG. 1, and past the heat transfer tubes 23, 24, 26. By nature of the crisscross arrangement of heat transfer tubes, the flow of primary coolant by and between the heat transfer tubes 23, 24, 26 may cascade past the alternating tubes to facilitate consistent and even flow rates through steam generation system 16. The flow of primary coolant may cause the secondary coolant flowing through the heat transfer tubes 23, 24, 26, to heat up and turn to steam, as discussed above. By coiling the heat transfer tubes it is possible to increase a surface area of the tubes for a given axial cylinder in order to maximize the heat transfer from the primary coolant to the secondary coolant.

The initial section of the tube sets 23, 24 may be connected to the lower ITP 20 at a steeper angle than intermediate portions of the coils, in order to provide sufficient clearance over the lower ITP(s). The tube sets 23, 24 may also include a portion having a relatively shallower angle to offset the steeper angled portion to reduce the differences between helical angles of the various coils. An elliptically shaped ITP may allow for both horizontal and vertical attachment of heat transfer tubes. Whereas the upper and lower ITPs are generally described/illustrated as being oriented in a substantially vertical direction, other examples include orienting the ITPs in a substantially horizontal direction.

Figure 6A:
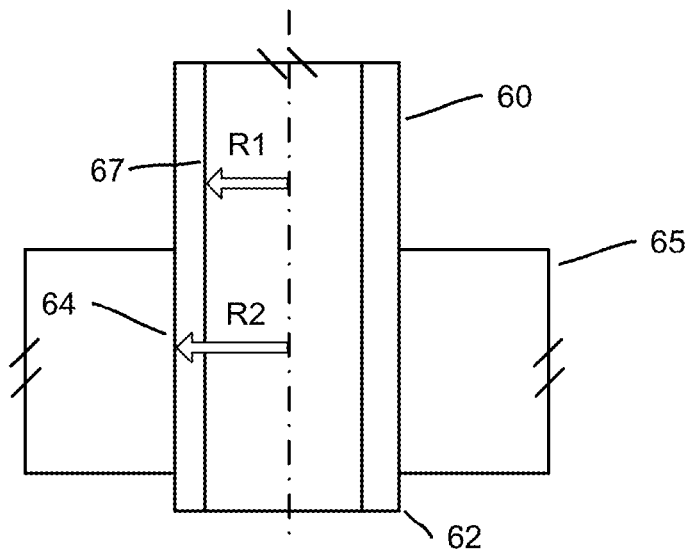
FIG. 6A illustrates a tube inserted into a tube sheet.

FIG. 6A illustrates a tube 60 inserted into a tube sheet 65. Tube 60 may include an inner radius R1 as measured to an inner surface 67 of the tube 60. Additionally, tube sheet 65 may include a through-hole having a radius R2. The inner radius R1 of the tube 60 may be smaller than the radius R2 of the through-hole. An outer surface 64 of the tube 60 may fit within the through-hole so that the tube 60 may be inserted into the tube sheet 65. The radius to the outer surface of the tube 60 may be just slightly less than the radius R2. When connecting the tube 60 to the tube sheet 65, the lower end 62 of the tube 60 may be inserted through the through-hole until it projects out an opposite side of the tube sheet 65.

Figure 6B:
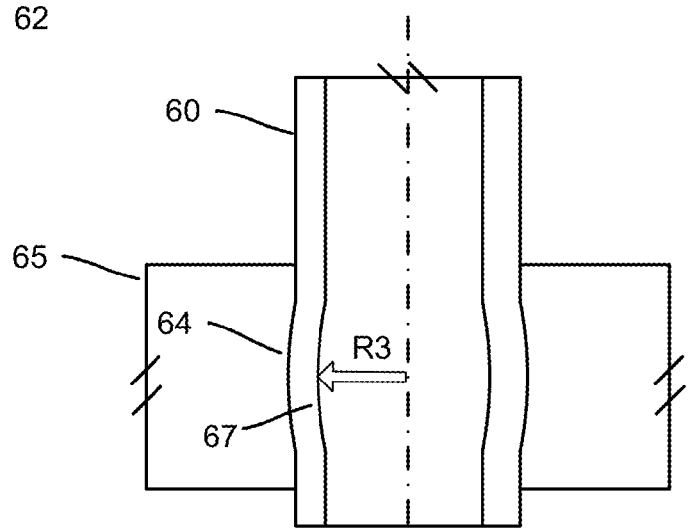
FIG. 6B illustrates a tube that has been plastically deformed within the tube sheet of FIG. 6A.

FIG. 6B illustrates the tube 60 after it has been plastically deformed within the tube sheet 65 of FIG. 6A. A pneumatic or hydraulic tool may be placed within the tube 60 and then operated to press against the inner surface 67 of the tube 60. As the inner surface 67 is extended out to radius R3, the outer surface 64 may also be extended into the surrounding wall of the through-hole to form a seal with the tube sheet 65. The radius R3 of the section of the tube 60 as deformed may be greater than the inner radius R1 of the rest of tube 60, such that there may be a slight bulge in the inner surface 67 of tube 60 after being plastically deformed. For example, radius R3 may be approximately 0.525 inches, and inner radius R1 may be approximately 0.515 inches. In order to avoid failure of the friction seal, or pressure fitting, the protruding portion of tube 60 may be seal welded to ensure a leak tight joint.

Figure 7:
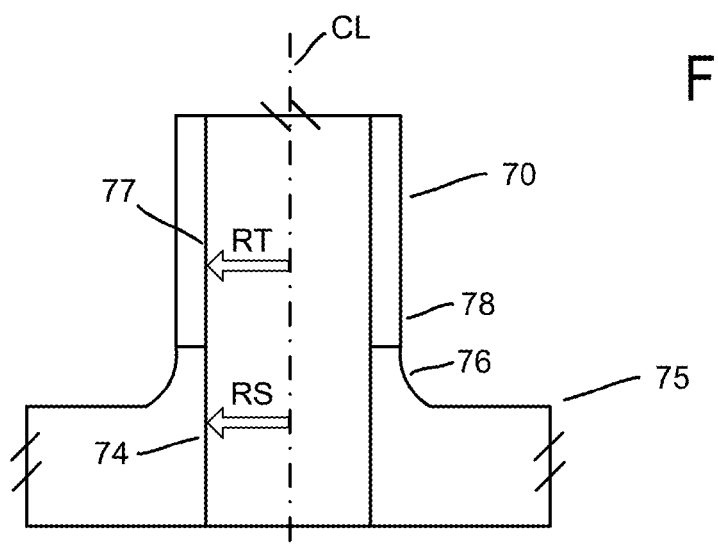
FIG. 7 illustrates a heat transfer tube connected to a tube sheet.

FIG. 7 illustrates a heat transfer tube 70 connected to a tube sheet 75. A tube stub 76 may be formed integral to the tube sheet 75 or ITP. The lower end 78 of the tube 70 may be connected to the stub 76. In one example, the inner radius RT of the tube 70, as measured to the inner wall 77 of the tube 70, may be the same as the inner radius RS of the through-hole of the tube sheet 75, as measured to an inner wall 74 of the tube sheet 75. The lower end 78 may be welded to stub 76 in order to fluidly connect the heat transfer tube 70 to the tube sheet 75.

After the tube 70 is connected to the tube sheet 75, the through-hole may form a continuous channel, having a uniform radius, through both the tube sheet 75 and the tube 70. For simplicity of illustration, the tube sheet 75 is shown as including a single stub 76, however it should be understood that the tube sheet 75 may comprise a plurality of stubs similar to stub 76.

Figure 8:
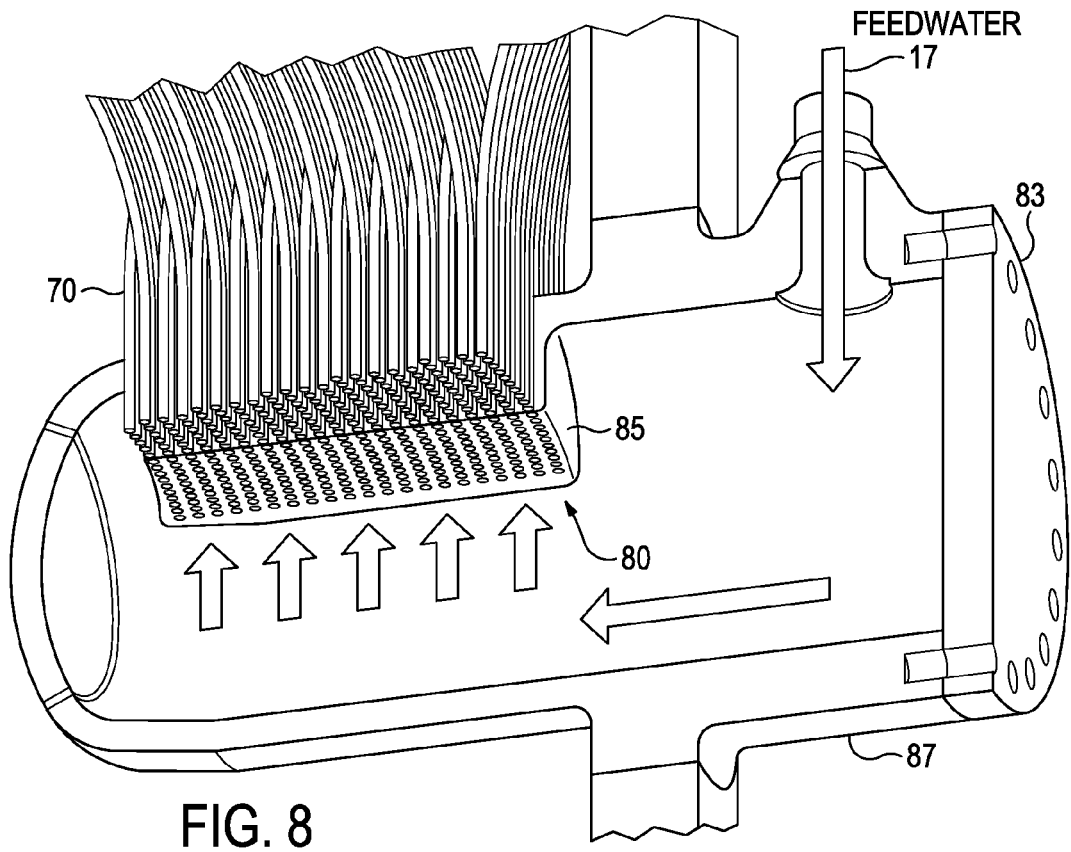
FIG. 8 illustrates a cross-sectional view of an example plenum with the feedwater flow direction indicated.

FIG. 8 illustrates a heat transfer system 80 with a cross-sectional view of an example plenum 87 with the feedwater flow direction illustrated. Feedwater 17, which may comprise secondary coolant, entering plenum 87 through a feed-line is illustrated by arrows as flowing through plenum 87 and into a plurality, or bundle, of heat transfer tubes, such as heat transfer tube 70 from FIG. 7. Plenum 87 may be configured to provide a transition between the heat transfer tubes and feedwater 17 and/or main steam nozzles. Access to plenum 87, either during or after installation of tubes for heat transfer system 80, may be provided by means of access port 83.

Although only one plenum is illustrated, heat transfer system 80 may comprise two or more plenums. In some examples, four lower plenums may be located approximate to a lower portion of the containment vessel and four upper plenums may be located approximate to an upper portion of the containment vessel. Additionally, the plenums may be divided between two or more heat transfer systems.

The plurality of heat transfer tubes may be fluidly coupled to plenum 87 via a tube sheet 85. In some examples, tube sheet 85 may be formed integral with plenum 87. Although tube sheet 85 is illustrated as being located in an approximately horizontal plane, other example tube sheets may be oriented in other planes, including a vertical plane. Similarly, tube sheet 85 may be substantially flat or curved in various examples. With reference to FIGS. 1 and 5, plenum 87 may be located at or near the bottom of the steam generator, such as illustrated by plenum 47 and plenum 20, respectively.

In some examples, tube flow restriction orifices may be installed at the face of tube sheet 85, where secondary flow enters the heat transfer tubes. Plenum 87 may contain an integral tube sheet on its upper surface which serves to attach the heat transfer tubes to plenum 87. A portion of plenum 87 located outside the reactor pressure wall may comprise a cylindrical nozzle to which a feedwater line is attached.

Maintenance work such as flow restrictor removal/installation, tube inspection, secondary side chemical cleaning, etc. may be performed with an upper portion of the containment vessel and/or the steam generator system, located in a dry dock. In some examples, the upper portion of the containment vessel may be removed from a lower portion of the containment vessel by removing and/or disengaging bolted flanges which connect the upper and lower portions. Removal of the upper portion of the containment vessel and/or the steam generator system may provide direct access to the heat transfer tubes and/or feed nozzles.

Figure 9:
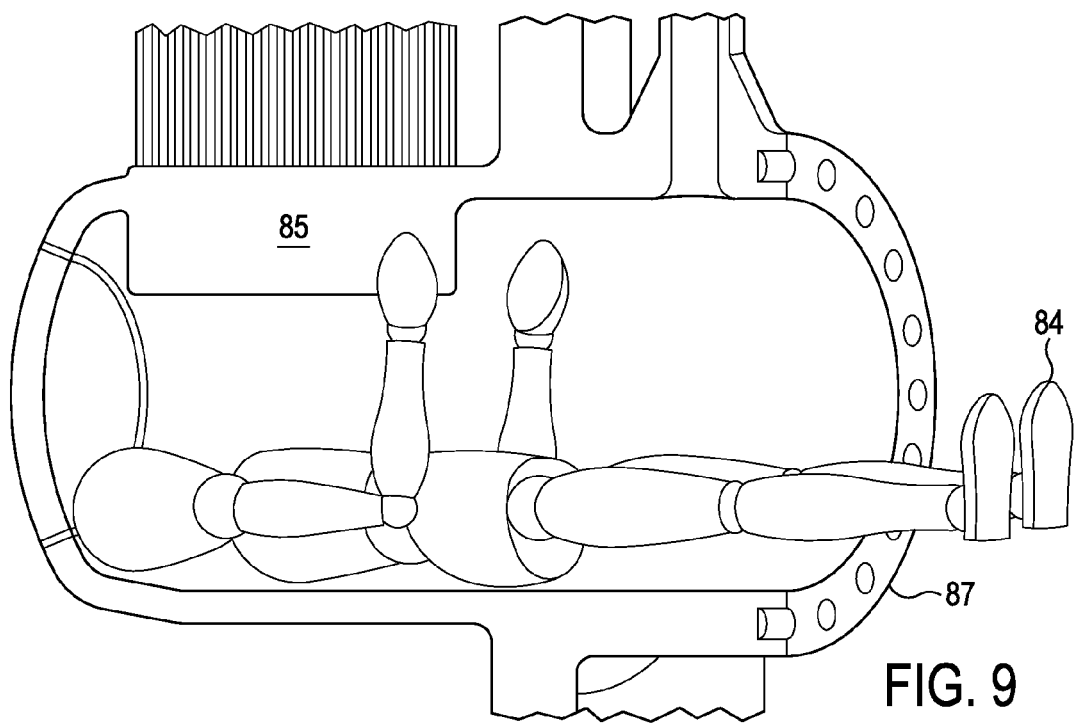
FIG. 9 illustrates an operator at least partially located within the example plenum of FIG. 8.

FIG. 9 illustrates an operator 84 at least partially located within the example plenum 87 of FIG. 8. Access to tube sheet 85 and/or one or more heat transfer tubes may be facilitated by removal of access port 83 (FIG. 8) from plenum 87. In some examples, access port 83 may be removed without removal of the upper portion of the containment vessel and/or the steam generator system.

Access to the interior region of plenum 87 may be provided for installation and/or removal of inlet flow restriction orifices and associated positioning and attachment hardware, including one or more orifice plates (as described further herein). Based on the size and geometry of plenum 87 and access port 83, it may be practical for operator 84 to enter plenum 87 and perform manual operations in the region of tube sheet 85, e.g., to remove and install flow restrictors and attachment hardware and perform any necessary flow restrictor installation inspections. In some examples, plenum 87 may comprise an approximately two foot inner diameter cylinder at the reactor pressure vessel and/or access port 83, which may taper to a smaller diameter near the internal end where the plenum 87 penetrates the central riser.

In some examples, a target total duration of 16 hours or less for removal and reinstallation of all the orifice devices may be established to minimize the impact on a refueling outage in the event orifice devices need to be removed to support heat transfer tube maintenance and/or inspections. Most if not all of the maintenance activities, including a full tube length inspection, may be performed with the orifice devices in place. In some examples, removal of some or all of the orifice devices may be performed to access the lower tube ends, for tube leak testing, and/or for suspected tube plugging.

Some operations may be completed in advance of the removal and/or installation of the orifice devices, e.g. placing the reactor module in the dry dock stand, draining the heat transfer tubes, removing the plenum access cover, locating associated scaffolding and/or platforms, installing shielding, etc. Additionally all of the plenums may be worked on in parallel.

Figure 10:
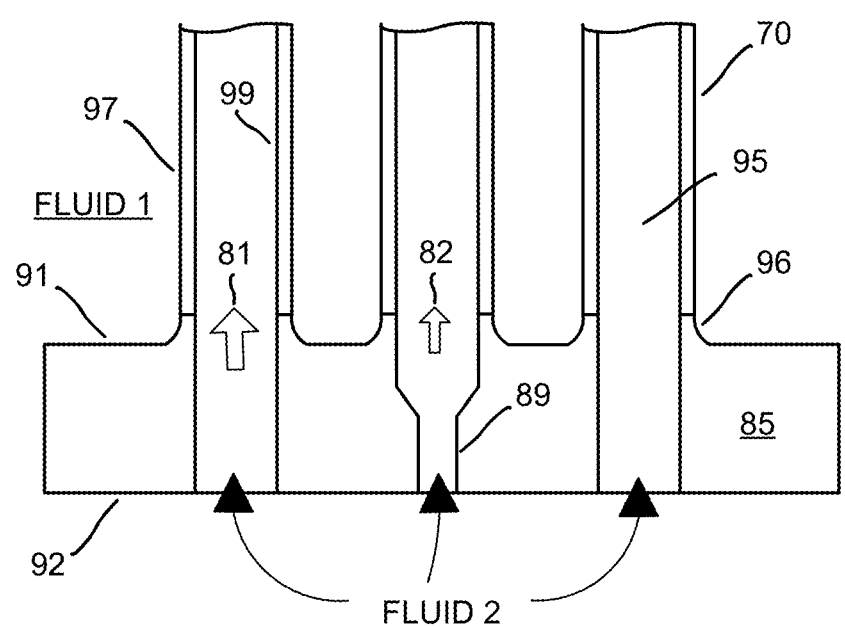
FIG. 10 illustrates a cross-sectional view of an example tube sheet.

FIG. 10 illustrates a cross-sectional partial view of an example tube sheet, such as tube sheet 85 of FIG. 8, operatively coupled to a plurality of example heat transfer tubes, such as heat transfer tube 70. Tube sheet 85 may provide a means for receiving a source of feedwater, or secondary coolant, identified as FLUID 2, into heat transfer tube 70. One or more stubs 96 may provide a means for fluidly coupling tube sheet 85 to a first tube set including heat transfer tube 70. Heat transfer tube 70 may be configured to convert the feedwater into steam when superheated primary coolant, FLUID 1, passes by or over the outside surface of heat transfer tube 70.

The first side 91 of tube sheet 85 may be in direct contact with the primary coolant FLUID 1. A second side 92 of tube sheet 85 may be in direct contact with the feedwater or secondary coolant FLUID 2. Tube sheet 85 may be configured to keep primary coolant FLUID 1 on the first side 91 of tube sheet 85. Heat transfer tube 70 may be welded or otherwise coupled to stubs 96 in order to keep primary coolant FLUID 1 separated from secondary coolant FLUID 2. In some examples, primary coolant FLUID 1 is kept isolated from secondary coolant FLUID 2, for example, where FLUID 1 contains radioactive or contaminated material, or where the mixture of primary coolant FLUID 1 and secondary coolant FLUID 2 may result in an adverse or combustible reaction.

The primary coolant FLUID 1 may be configured to heat up secondary coolant FLUID 2 as it passes through a channel 95 within heat transfer tube 70. Whereas an inner surface 99 of heat transfer tube 70 may be exposed to secondary coolant FLUID 2, the outer surface 97 of heat transfer tube 70 may be exposed to primary coolant FLUID 1. In some examples, both primary coolant FLUID 1 and secondary coolant FLUID 2 may comprise pressurized water. The pressure of primary coolant FLUID 1 may be greater than the pressure of secondary coolant FLUID 2. In some examples, the pressure of primary coolant FLUID 1 may be nearly four times greater than the pressure of secondary coolant FLUID 2.

Steam generators based on pressurized water reactor (PWR) designs may transfer heat from a primary coolant system (pressurized water) to a secondary coolant. For example, secondary coolant FLUID 2 traveling through heat transfer tube 70 may be heated by the surrounded primary coolant FLUID 1, causing secondary coolant FLUID 2 to boil, become superheated, and/or form steam. Boiling and/or superheating may present operating conditions that differ from a nuclear reactor design that comprises external tube boiling, for example.

Dynamic instability between the heat transfer tubes, which may be characterized as density wave oscillations (DWO), may originate from waves of heavier density and lighter density fluids within the heat transfer tubes and the respective delay in propagating the secondary coolant FLUID 2 through heat transfer tube 70. The difference in density between the relatively cooler secondary coolant FLUID 2 entering heat transfer tube 70 and the relatively hotter secondary coolant FLUID 2 exiting heat transfer tube 70, e.g., as low density steam, may trigger a delay in the transient distribution of pressure drop along heat transfer tube 70. The transient distribution of pressure drop may lead to self-sustained oscillations, with single-phase and two-phase pressure drops oscillating in counter-phase. One way to limit DWO to an acceptable, e.g., low, level is to provide one or more orifices at an inlet of the heat transfer tubes.

An orifice 89 may be used to equalize and control the flow of secondary coolant FLUID 2, or feedwater, through heat transfer tube 70. Orifice 89 may be sized such that the flow through each of heat transfer tubes is similar, or equal to each other. For example, a first flow rate 81 of secondary coolant FLUID 2 through a first heat transfer tube without an orifice may be similar to or equal to a second flow rate 82 of secondary coolant FLUID 2 through a second heat transfer tube that includes an inlet orifice, such as orifice 89. Similarly, orifice 89 may be sized such that heat transfer to the fluid inside heat transfer tube 70 is similar, or equal, for each of the heat transfer tubes. In addition, orifice 89 may be sized to reduce back pressure or back flow and to thus stabilize the flow through all of the heat transfer tubes. In other examples, two or more heat transfer tubes may comprise differently sized orifices in order to control the respective flow rate and/or back pressure for each heat transfer tube. An orifice, such as orifice 89, may be included for some or all of the heat transfer tubes. In some examples, orifice 89 may be placed within or made integral to tube sheet 85.

Orifice 89 may be used to reduce pressure of secondary coolant FLUID 2. In some examples, orifice 89 may be configured to reduce pressure of secondary coolant FLUID 2 by an amount of between 100.0 mmHg and 300.0 mmHg. Reducing and/or stabilizing the pressure of secondary coolant FLUID 2, may help to avoid any momentary oscillations between wet steam and dry steam, for example during low power operation of the nuclear reactor module, which may, in turn, reduce the possibility of wet steam being coupled into one or more turbines, such as turbines 31, 32 (FIG. 1). In some examples, the combined pressure loss across orifice 89 and the subcooled tube inlet section may exceed the pressure losses across the two-phase and superheated tube sections.

An inlet flow restriction orifice may be positioned and/or attached for each heat transfer tube. The inlet flow restriction orifice may be used to provide stable secondary-side flow within the tubes. Additionally, the inlet flow restriction orifice may be configured to achieve a specified inlet flow loss coefficient during operation of the heat transfer system at full power to ensure sufficiently stable flow through the tubes. In some examples, the inlet flow restriction orifices may be removed and/or reinstalled, e.g., during shutdown periods, in order to support tube maintenance operations. The ability to remove and/or access the inlet flow restriction orifices and inlet nozzles of the heat transfer system facilitate an inspection of the entire length of the heat transfer tubes and heat transfer system in general.

A center orifice flow restrictor may provide flow restriction by directing the flow of coolant through a cylindrical hole with a reduced diameter compared with the inner diameter of the heat transfer tube. In some examples, center orifice flow restriction may be accomplished by small orifice holes drilled through an orifice plate which may be pressed against either the tube ends or the face of the tube sheet. In other examples, individual orifices may be inserted into each tube or mounted against each tube end. The orifice device may be aligned with an individual tube and be configured to restrict the flow entering that tube. An annular flow restrictor may comprise a solid device inserted into the center of each heat transfer tube, and may be configured to restrict the flow of coolant entering the heat transfer tube by channeling the flow through an annulus between the orifice device and the inner diameter of the heat transfer tube, and/or through a center orifice hole drilled through the length of the insert.

Either the center orifice flow or annular flow concepts may be sized to achieve a desired flow loss coefficient. However, the two concepts may be affected by manufacturing and assembly tolerances and operational deformations in fundamentally different ways. Center orifice flow restrictor concepts may be susceptible to bypass flow associated with tolerances and deformations that permit flow to pass into the tube in a manner that bypasses the intended cylindrical orifice flow path. Flow that leaks between the plate and the tube end or between the plate and the tube sheet may bypass the orifice and reduce its effectiveness. If these leakage flow plates are large enough, the flow restrictors may be ineffective in achieving the target inlet flow loss coefficient. On the other hand, annular flow restrictors may be configured to provide a single flow path through the annulus between the device and the inner diameter of the tube.

Figure 11:
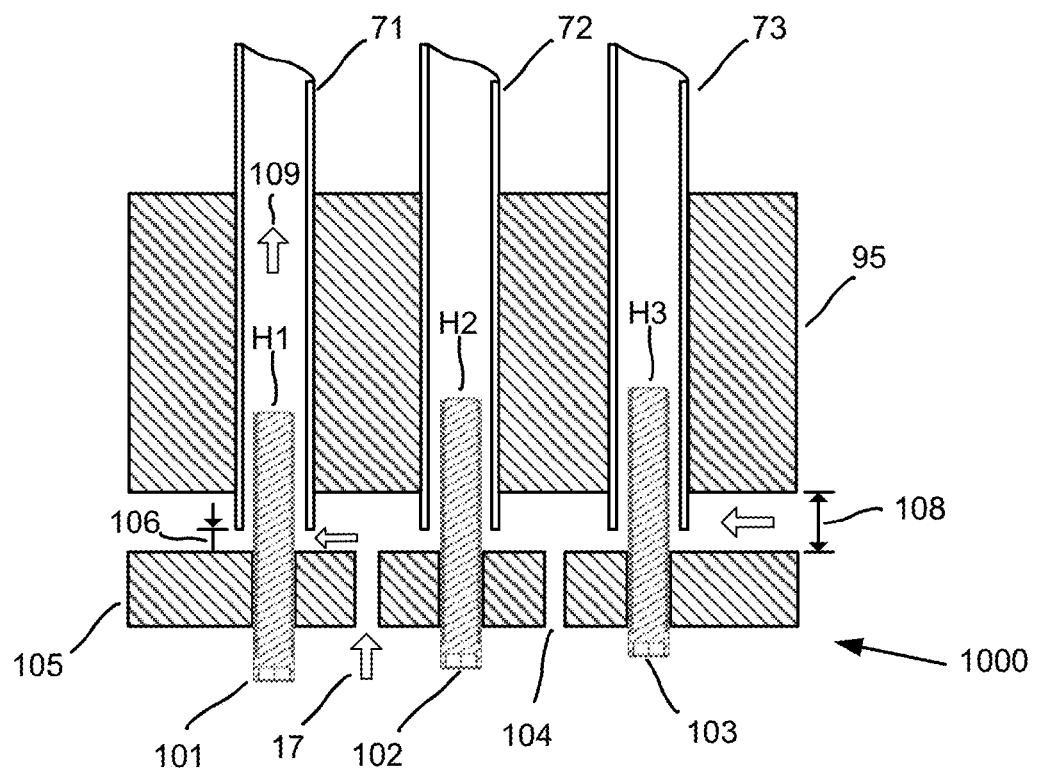
FIG. 11 illustrates a cross-sectional view of an example tube aligning orifice system.

FIG. 11 illustrates a cross-sectional partial view of an example tube aligning orifice system 1000 comprising an orifice plate 105. Orifice plate 105 may be mounted within a plenum, such as plenum 47, plenum 87, plenum 47A, plenum 320, or plenum 20 (FIGS. 1-5 and 8), and adjacent to a tube sheet, such as tube sheet 95. For example, orifice plate 105 may be located within a plenum and below tube sheet 95. Orifice plate 105 may be spaced apart from tube sheet 95 by a fluid channel 108. Fluid channel 108 may be configured to allow for the flow of feedwater 17 between orifice plate 105 and tube sheet 95. In some examples, orifice plate 105 may be mounted to tube sheet 95. In other examples, orifice plate 105 may be mounted to a surrounding plenum.

A plurality of heat transfer tubes, such as a first heat transfer tube 71, a second heat transfer tube 72, and a third heat transfer tube 73, may be fitted, inserted, attached, and/or coupled to tube sheet 95. In some examples, a lower end of a heat transfer tube, such as first heat transfer tube 71, may extend out of tube sheet 95, such that the lower end of first heat transfer tube 71 may be spaced apart from orifice plate 105 by a gap 106. Gap 106 may be configured to allow for the flow of feedwater 17 into one or more of the plurality of heat transfer tubes.

One or more orifice devices, such as a first orifice 101, a second orifice 102, and a third orifice 103, may be fitted, inserted, attached, and/or coupled to orifice plate 105. In some examples, one or more of the orifice devices may comprise an annular flow restrictor. In other examples, one or more of the orifice devices may comprise center flow restrictors. First orifice 101 may be configured to be inserted into first heat transfer tube 71 to an insertion depth H1. Second orifice 102 may be configured to be inserted into second heat transfer tube 72 to an insertion depth H2. Similarly, third orifice 103 may be configured to be inserted into third heat transfer tube 73 to an insertion depth H3. The one or more orifice devices may be inserted into the heat transfer tubes at varying depths. For example, insertion depth H2 may be greater than insertion depth H1, and insertion depth H3 may be greater than both insertion depth H1 and insertion depth H2.

There may inherently be differences in flow rate and/or pressure within the plurality of heat transfer tubes, for example, as a result of different length tubes, different flow rates of the feedwater 17 at the tube inlets, as well as other thermal and/or mechanical differences for each tube. The insertion depth of an orifice device, such as first orifice 101, may be varied in order to individually control the flow rate, heat transfer, and/or pressure of fluid 109 which travels through each heat transfer tube, such as first heat transfer tube 71. In some examples, the distance, or size of fluid channel 108, between orifice plate 105 and tube sheet 95 may be made to vary in order to vary the insertion depth of one or more orifice devices and/or to vary the gap, such as gap 106, associated with one or more heat transfer tubes. For example, a mounting device could be configured to move orifice plate 105 closer to or further from tube sheet 95 during assembly, maintenance, and/or adjustment of tube aligning orifice system 1000, thereby increasing or decreasing, respectively, the size of fluid channel 108 and/or the spacing of gap 106.

Orifice plate 105 may comprise one or more flow channels, such as flow channel 104, intermediate the orifice devices. For example, flow channel 104 may be configured to provide for additional flow of feedwater 17 to the plurality of heat transfer tubes. Although flow channel 104 is illustrated as being smaller, e.g., having a smaller diameter, than the illustrated orifice devices, in some examples orifice plate 105 may comprise one or more flow channels which are larger than the orifice device and/or are larger than a hole in orifice plate 105 through which the orifice device is located.

In still other examples, flow channels may be approximately the same size as other holes through which the orifice devices are located.

In some examples, feed flow to the tube ends may comprise the flow of feedwater 17 through orifice plate 105 and/or bypass of feedwater 17 around orifice plate 105. Orifice plate 105 may be configured to stand off from the face of tube sheet 95 by approximately 0.5 inch, e.g., via spacers on one or more attachment studs. The spacing between orifice plate 105 and tube sheet 95 may be configured to permit the flow of feedwater 17 to enter the tubes through fluid channel 108 and/or gap 106. Additionally, the spacing may be configured to provide a volume to permit flow distribution prior to entering the tubes. The flow dependant pressure drop to the tube ends may be minimized to provide a uniform flow distribution to the tube ends.

Flow channels 104 may comprise flow holes between each row of orifice device mounting holes to permit flow from the plenum volume through orifice plate 105. In some examples, flow channels may comprise approximately 0.25 inch diameter flow holes. The plate standoff can be adjusted and additional flow holes can be added or the flow hole size adjusted to vary the amount of flow through orifice plate 105 and/or the amount of bypass flow around orifice plate 105.

The ends of the heat transfer tubes may nominally extend beyond the face of tube sheet 95. In some examples, the ends of the heat transfer tubes may be machined to a common plane. In the event that the heat transfer tubes are expanded into the holes of tube sheet 95, the inner diameter of one or more of the heat transfer tubes may be larger inside tube sheet 95 than in the portion of the heat transfer tube that protrudes beyond tube sheet 95. In some examples, the portion of the heat transfer tube that protrudes beyond tube sheet 95 may comprise an inner diameter which, after expansion into the tube sheet hole, may be slightly enlarged.

The orifice holes in orifice plate 105 may be match machined to the as-built location of the tube holes in tube sheet 95 to improve the alignment of the orifice holes with the respective heat transfer tubes. Use of a coordinate measuring machine, control of atmospheric conditions, and/or precision drilling equipment may be used to reproduce the location of the tube sheet holes onto orifice plate 105 within a design tolerance.

Installation and removal of the orifice devices and associated attachment hardware may be performed in service to provide access for inspection of the tube-to-tube sheet welds and/or the portion of the heat transfer tubes in or near tube sheet 95. Because time may be of the essence during outages, the orifice devices and/or attachment hardware should be capable of being installed or removed in as short a time as practical. The orifice devices, attachment hardware, and orifice plate 105 may comprise assembly/assembled parts that are smaller than the access port 83 (FIG. 8) and can therefore be moved into or out of the plenum through the access port. In some examples, tube sheet 95 may be located approximately one and half feet above the bottom of the inner surface of the plenum. Additionally, the orifice devices may extend into the respective heat transfer tubes while a portion of the length (e.g., several inches) may remain outside the heat transfer tubes to accommodate a spacing of orifice plate 105 from tube sheet 95.

Figure 12:
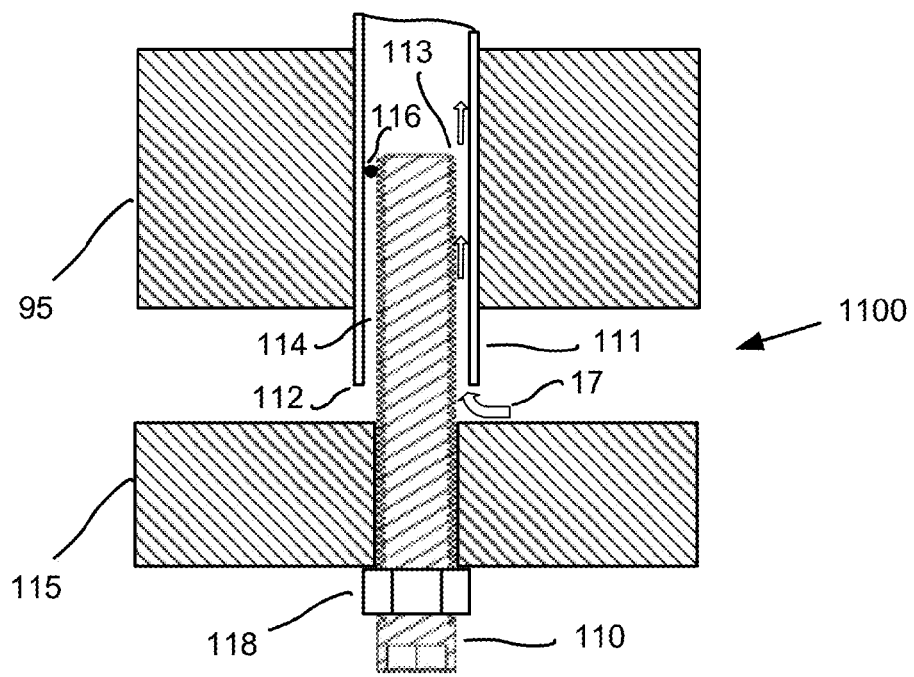
FIG. 12 illustrates an example tube aligning orifice system.

FIG. 12 illustrates an example tube aligning orifice system 1100 comprising an orifice device 110 mounted to an example orifice plate 115. In some examples, orifice device 110 may be threaded or screwed into a through-hole of orifice plate 115. For example, orifice device 110 may comprise external threads that mate with internal threads of orifice plate 115 in order to adjust and/or secure the position of orifice device 110 with respect to an adjacent tube sheet, such as tube sheet 95. In some examples, orifice device 110 may be turned one or more partial or complete revolutions within orifice plate 115 to increase or decrease the insertion depth of orifice device 110 into a heat transfer tube, such as heat transfer tube 111. A securing device, such as securing device 118, may be configured to hold, lock, secure, fix, or otherwise maintain the position of orifice device 110 relative to orifice plate 115. For example, subsequent to installation of tube aligning orifice system 1100, securing device 118 may be configured to keep orifice device 110 from inadvertently moving during operation of the heat transfer system.

During installation, maintenance, adjustment, and/or inspection, securing device 118 may be loosened to allow for adjustment of the position of orifice device 110. Similarly, orifice device 110 may be attached and/or removed from orifice plate 115. Orifice device 110 may be inserted into, or withdrawn from, the interior of heat transfer tube 111 by rotating orifice device 110 relative to orifice plate 115. In some examples, a plurality of orifice devices may all be withdrawn together by removing and/or disconnecting orifice plate 115 from tube sheet 95 and/or by removing and/or disconnecting orifice plate 115 from a surrounding plenum. For example, one or more orifice devices, such as orifice device 110, and/or one or more orifice plates, such as orifice plate 115, may be moved and/or removed during a full-length inspect of the heat transfer tube(s). Similarly, a plurality of orifice devices may all be inserted together into tube sheet 95 by installing and/or mounting orifice plate 115 to tube sheet 95 and/or to a surrounding plenum.

An incremental adjustment to the insertion depth of orifice device 110 may be made to attain different orifice pressure losses and/or flow rates of feedwater 17 through heat transfer tube 111. Feedwater 17 may enter through an orifice inlet 112 located between an inner wall of heat transfer tube 111 and orifice device 110. Feedwater 17 may flow through an orifice passageway 114 located within heat transfer tube 111 and along the exterior surface of orifice device 110 as bypass flow. Orifice passageway 114 may be configured to fluidly connect orifice inlet 112 with an orifice outlet 113 located within heat transfer tube 111. In some examples, orifice passageway 114 may comprise an annular region surrounding orifice device 110.

An alignment device 116 may be provided within heat transfer tube 111 to align orifice device 110 within heat transfer tube 111. For example, alignment device 116 may be configured to center orifice device 110 along an approximately longitudinal centerline of heat transfer tube 111 to provide a uniform orifice passageway for the bypass flow of feedwater 17. Alignment device 116 may be located near or at an end of orifice device 110 proximate orifice outlet 113. In some examples, alignment device 116 may be attached to orifice device 110 prior to insertion of orifice device 110 into heat transfer tube 111.

In addition to centering orifice device 110 inside heat transfer tube 111, alignment device 116 may also be configured to minimize the amount of bypass leakage flow that can occur. In examples where a portion of heat transfer tube 111 is expanded within tube sheet 95, alignment device 116 may be sized and/or configured to pass through the smaller diameter entrance at the lower end of heat transfer tube 111 while still being large enough to provide sufficient force against the expanded portion of heat transfer tube 111 in the installed position to effectively provide centering.

The orifice devices illustrated in FIGS. 10 and/or 11 may be inserted into the heat transfer tubes or designed to bear against the ends of the heat transfer tubes. In some examples, use of one or more mounting plates may be used to affix the orifice devices in place without directly affecting the ends of the heat transfer tubes. The use of one or more integrated mounting plates may also facilitate installation and/or removal of the orifice devices from the plenum.

Figure 13:
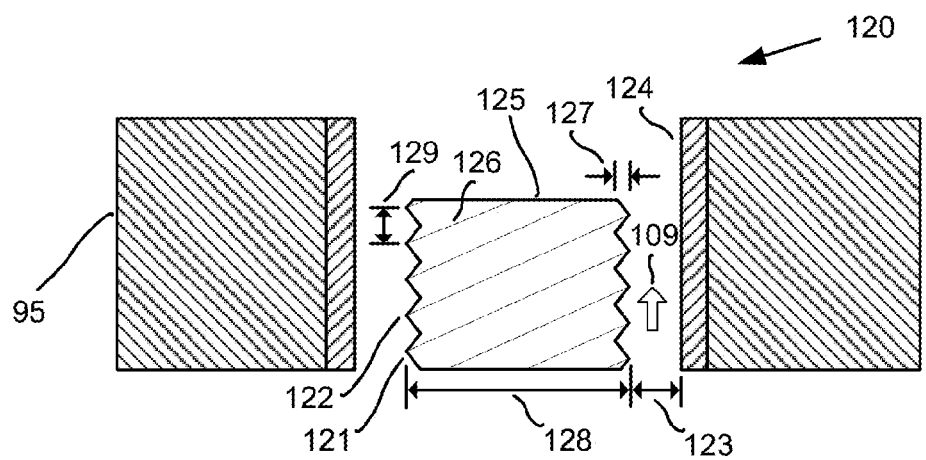
FIG. 13 illustrates an enlarged cross-sectional view of an example tube aligning orifice system.

FIG. 13 illustrates an enlarged cross-sectional view of an example tube aligning orifice system 120 including an orifice 125 at least partially located within a heat transfer tube 124. Heat transfer tube 124 is illustrated as being located, at least partially, in tube sheet 95, shown in cross-section for purposes of illustrative explanation. Orifice 125 may comprise one or more external threads 122 that may be configured to provide an incremental orifice pressure drop within heat transfer tube 124. For example, each of the external threads 122 may provide for a separate incremental pressure drop and/or pressure transition step. External threads 122 may provide a large number of transition steps over a relatively short distance. An incremental pressure drop in the annulus between the orifice 125 and the inner wall of heat transfer tube 124 may occur for each transition step, providing for a variable annular flow of fluid 109 through heat transfer tube 124. In some examples, external threads 122 may comply with standard UNC-2A external coarse-threaded fasteners (ASME B1.1-2003). In other examples, external threads 122 may be custom-designed. External threads 122 may be helical.

External threads 122 may be classified or identified based, at least in part, on one or more of a thread angle 126, a thread depth 127, and a thread pitch 129. Similarly, orifice 125 may be identified by the thread classification in addition to a diameter 128 and/or length of orifice 125. A flow path 123 between orifice 125 and heat transfer tube 124 may vary and/or be dependent upon the diameter 128 and/or length of orifice 125. Thread pitch 129 may be used to determine how many transition steps there are for a given length of orifice 125. For example, a pressure transition step may occur for each additional thread that is inserted into heat transfer tube 124. Additionally, a helical thread may provide for a spinning, rotating, and/or spiraling flow path for fluid 109 to flow around orifice 125 and through heat transfer tube 124 in a streamlined manner. The spiraling flow path may provide for a more uniform flow path through heat transfer tube 124 and improve the heat transfer of the fluid by reducing any surface boundary heat flux stagnation at or near the orifice exit and/or by shorting the length of the single phase region within heat transfer tube 124. Additionally, the spiraling flow path may provide the opportunity to shorten the overall length of heat transfer tube 24 itself.

The pressure drop and/or flow rate of fluid 109 through heat transfer tube 124 may be controlled and/or varied by using different type, shape, or sized orifices. For example, in addition to insertion depth as illustrated by FIG. 11, the pressure drop and/or flow rate of fluid 109 may be controlled by varying the thread angle 126, thread depth 127, thread pitch 129, diameter 128, and/or insertion depth of orifice 125.

In addition to operating as transition steps that provide incremental pressure drops within a corresponding heat transfer tube, the external threads may provide one or more or all of the following functions: means for securing and/or mounting the orifice device to a mounting structure such as an orifice plate, means for finely controlling the insertion depth of the orifice device into the corresponding heat transfer tube, and/or means for providing a helical flow path for fluid/feedwater entering the corresponding heat transfer tube.

The orifice device may tend to move within the heat transfer tube during operation of the reactor due to flow-induced vibration, differential thermal expansion of inserts and tubes, and/or tube sheet bowing due to coolant pressure differences. Whereas other types of orifice shapes, such as rectangular stepped insert orifices may also provide a step function, the relatively smaller number of transition steps per length of the orifice may require a tighter fit (e.g., smaller clearance) with the inner tube wall and/or a longer orifice length to achieve a similar orifice pressure loss as an externally threaded orifice with a relatively larger number of transition steps. Having a larger number of transition steps may result in a shorter required insertion depth of the orifice device within the heat transfer tube, easier fit-up (e.g., greater alignment tolerance), and increased clearance between the orifice device and the inner tube wall during assembly, maintenance, inspection, and/or operation of the heat transfer system.

Steam generator secondary flow stability and inlet orifice behavior can be analyzed for full-power steady state operation at beginning of life (BOL) conditions. The steam generator may be operating at or near normal, full-power most of the time, with small-percentage fluctuations of secondary flow, pressure and temperature.

At least two types of instability may be observed in once-through steam generators with inside tube boiling. A first type of instability may comprise a static instability between the module steam/feedwater pipes. In static instability (also known as Ledinegg instability), a perturbation may cause a change in flow characteristics that will dampen out until a new steady state condition is reached. In a second type, instability between the heated tubes may be categorized as a density wave oscillation (DWO) by considering its dynamic generation mechanism, closely related to the oscillating phase boundaries of the two-phase region. The flow fluctuation may progress due to a delayed steam pressure change at the tube outlet relative to a disturbance at the tube inlet. The instability may be attributed to waves of heavier and lighter fluids, and respective delays through the channel. The difference in density between the fluid entering the heated channel (that may comprise subcooled liquid) and the fluid exiting (that may comprise low density steam) may trigger delays in the transient distribution of pressure drops along the tube, which may lead to self-sustained oscillations (with single-phase and two-phase pressure oscillating in counter-phase).

Density wave oscillations may be considered as a primary dynamic type secondary flow instability mode in certain types of heat transfer system designs. A constant-pressure-drop boundary condition (such as that provided by two or more parallel channels connected to common headers) may be used to excite the flow rate perturbations at the inlet of the boiling channel. In some examples, a large degree of secondary inlet subcooling may delay the onset of DWO, because the single phase subcooled liquid region will be longer.

Secondary flow at superheated exit conditions may be improved with the presence of inlet orifices in order to attain stable secondary dynamic flow performance, e.g., to provide for a more stable operating range, for example with respect to density wave oscillations.

In some examples, the tubes may be inclined at angles greater than 10 degrees. For a bounding assessment of secondary flow stability, the boundary mass velocity for vertical pipes may be calculated based on the adjustment factor for vertical pipes. The boundary mass velocity for vertical pipes may be approximately double the boundary mass velocity for horizontal pipes, for some example operating conditions.

An orificing coefficient, or ratio of hydraulic resistance across the orifice plus subcooled region to that of the two-phase plus superheated region, may be used to evaluate secondary flow stability. In some examples, the orificing coefficient may exceed a ratio of four for nominal full-power operation, based on the pressure losses across the orifice, and in the subcooled and outlet regions.

The inlet flow orifices may be located at the bottom of the plenum tube sheet and mounted on one or more separate orifice support plates. The orifices may be configured to be readily removable and installable during a refueling outage. Additionally, the orifices may be configured and/or adjusted so that they tolerate misalignment of the orifice support plate(s) and individual orifices axially, laterally, and/or angularly (with respect to the tube centerline axis) yet still attain the target hydraulic resistance value within an acceptable range. The orifices may be configured to limit and/or provide a relatively constant bypass flow into the tube inlets.

Center flow orifices rely on a tight fit between the outer diameter of the orifice device and the inner diameter of the tube to restrict bypass flow. In this case the tolerance on the true position of the tube and the tolerance on the true position of the attachment hole in the orifice plate may be used to control the fit up. In some examples, one or more of the orifices described herein may comprise a center flow in addition to, or in place of, the illustrated bypass flow in an annular and/or threaded region of the orifice device.

Annular flow orifices, on the other hand, may be configured to permit flow through the annulus located between the orifice insert and the tube. Screw-type orifices may comprise externally threaded inserts that attain a high inlet orifice pressure drop by providing a large number of transition steps over a short distance. The pitch of the external threads may be defined as the inverse of the number of threads per inch. For example, an insert designation ⅜-16 corresponds to a ⅜ inch outer thread diameter fastener with a pitch of P=1/16 inch.

The threads may provide for a plurality of pressure transition steps per unit length (e.g., per inch or per centimeter) of the insertion depth of the orifice device. An orifice device with a relatively large number of transition steps per unit length may accomplish the same heat transfer and/or pressure drop as compared to a longer orifice device having fewer transition steps per unit length. A shorter orifice device may reduce misalignment issues during installation, inspection, and/or maintenance and also may reduce the likelihood of the orifice device contacting and/or cyclically impacting the inner surface of the heat transfer tube during operation of the heat transfer system.

For a relatively thick-edged orifice, the ratio of the length of the transition step to the hydraulic diameter of the reduced flow section may be greater than approximately 0.015. For a circular orifice hole, the hydraulic diameter may be calculated as the ratio of four times the constrained slot area to slot circumference. Some example orifices may comprise a step height to hydraulic diameter ratio greater than 3.0, and be relatively insensitive to the transition step angle of the orifice insert.

The transition k-factor including form loss and friction loss may be calculated based on Equation 1, and may be normalized to the velocity of the unrestricted (downstream) tube flow cross-section $F_2$.

$$k = \frac{\Delta P}{\rho \omega_2^2/2} = \xi_{loc2} + \xi_{fr2} = \xi_{loc}\left(\frac{F_2}{F_0}\right)^2 + \lambda \frac{l_2}{n_{or}^2 D_h} \quad \text{Equation 1}$$

Where:
$\Delta P$ pressure drop across orifice, [Pa]
$\rho$ fluid density (inverse of specific volume), [kg/m³]
$\omega_2$ velocity in (downstream tube) flow section $F_2$, [m/s]
$\xi_{loc2}$ transition loss coefficient based on downstream velocity $\omega_2$, [-]
$\xi_{loc}$ transition loss coefficient from literature, [-]
$\xi_{fr2}$ friction loss coefficient based on downstream velocity $\omega_2$, [-]
$\lambda$ friction loss coefficient in orifice net flow cross-section area $F_1$, [-]
$l_2$ length of reduced tube flow section, [m]
$D_h$ hydraulic diameter of orifice net flow cross-section area $F_1$, [m]
$F_0$ small (reduced) orifice net flow cross-section area, [m²]
$F_2$ flow cross-section area downstream of orifice, [m²]
$n_{or}$ orifice flow cross-section area ratio ($F_0/F_2$), [-]

For multiple (stacked) transitions (from a larger reduced flow area $F_1$, to a small reduced flow area $F_0$ at the outermost radius), Equation 2 may be used, taking into consideration the number of transition steps and the flow area ratios.

$$k = (N\xi_{loc})\left(\frac{F_2}{F_1}\right)^2 + \lambda \frac{l_2}{n_{or}^2 D_h} \quad \text{Equation 2}$$

Where:
N number of transition steps, [-]
$F_1$ larger (root of thread or step) orifice net flow cross-section area, [m²]
$F_2$ flow cross-section area downstream of orifice, [m²]
$\xi_{loc}$ transition loss coefficient from literature, [-]
$\lambda$ friction loss coefficient in orifice net flow cross-section area $F_1$, [-]
$l_2$ length of reduced tube flow section, [m]
$D_h$ hydraulic diameter of orifice net flow cross-section area $F_1$, [m]
$n_{or}$ orifice flow cross-section area ratio ($F_1/F_2$), [-]

For a threaded insert orifice, the number of transition steps may be specified by the number of threads per inch (e.g. 16 threads per inch for ⅜-16 UNC-2A threaded inserts) times the inserted length (insertion depth) of the orifice in the tube. The friction coefficient may be determined assuming a circular tube with smooth walls. Similarly, the Reynolds Number in the tubes may be assumed to be fully turbulent with a constant friction coefficient corresponding to a bounding value for turbulent flow. Based on the hydraulic resistance coefficients of the particular orifice, hydraulic resistance coefficients may range from approximate values of k=10² (minimum) to k=10⁴ (maximum), depending on orifice type and specifications.

In some examples, the minimum required hydraulic resistance coefficient k-factor may be determined for boiling in horizontal tubes. Vertically oriented tubes may use a higher k-factor value.

Figure 14:
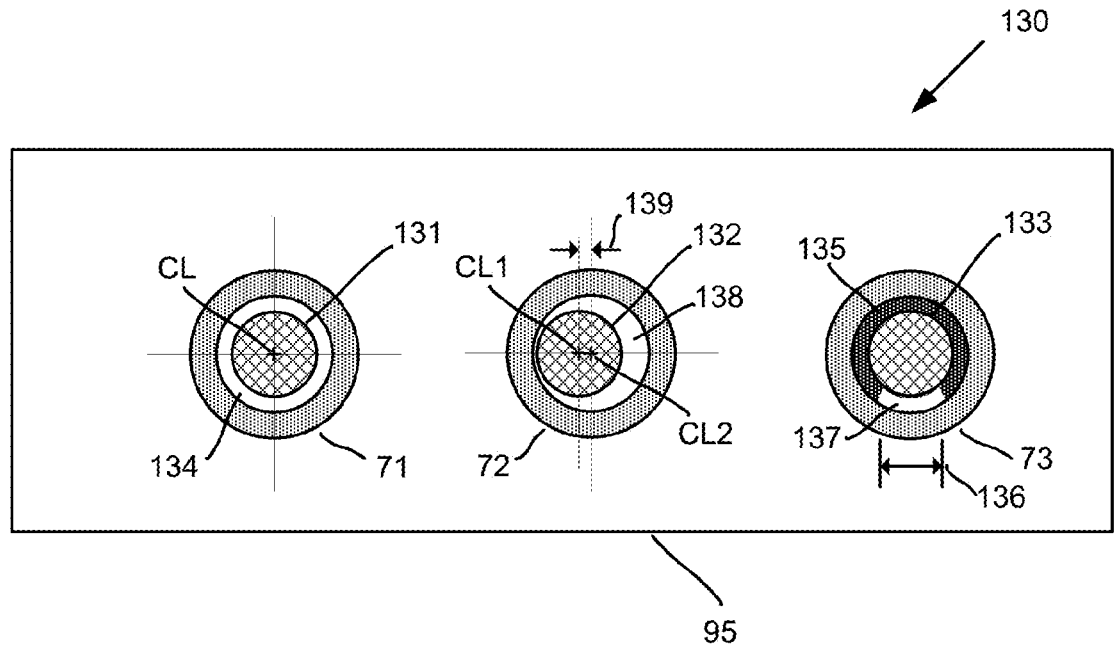
FIG. 14 illustrates an enlarged partial top view of an example tube aligning orifice system.

FIG. 14 illustrates an enlarged partial top view of an example tube aligning orifice system 130. For illustrative purpose, three heat transfer tubes, namely first heat transfer tube 71, second heat transfer tube 72, and third heat transfer tube 73, are shown in partial tube sheet 95, although one of skill in the art would appreciate that a tube sheet may include considerably more heat transfer tubes than that shown. Tube aligning orifice system 130 may comprise a first orifice device 131, shown located within first heat transfer tube 71, a second orifice device 132, shown located within second heat transfer tube 72, and a third orifice device 133, shown located within third heat transfer tube 73.

First orifice device 131 and first heat transfer tube 71 are shown positioned at a common longitudinal centerline CL, such that a uniform annular flow path 134 is provided for feedwater to flow between first office device 131 and first heat transfer tube 71. Second orifice device 132 is shown located at longitudinal centerline CL1 which may be offset from a longitudinal centerline CL2 of second heat transfer tube 72 in one or more axial directions. For example, longitudinal centerline CL1 is illustrated as being offset from longitudinal centerline CL2 by an offset 139. Depending on the amount of offset 139, the position of orifice device 132 may move within the interior of second heat transfer tube 72. For example, orifice device 132 may be located near an interior wall of second heat transfer tube 72 when offset 139 is at or near a maximum allowable alignment tolerance. The offset second orifice device 132 may result in a non-uniform flow path 138 of fluid through second heat transfer tube 72 as compared to uniform annular flow path 134 in heat transfer tube 71.

Tube aligning orifice system 130, including one or more aligning orifice devices, may be configured to maintain the amount of offset 139 within a maximum allowable alignment tolerance. In some examples, the maximum allowable alignment tolerance may be set such that any variation between pressure, heat transfer, and/or flow rate within non-uniform flow path 138 is kept within a predetermined tolerance as compared to uniform annular flow path 134.

In some examples, a pressure, heat transfer, and/or flow rate of fluid through non-uniform flow path 138 may be different than a pressure, heat transfer, and/or flow rate of fluid through uniform annular flow path 134, at least for a similarly sized and/or similarly positioned orifice device. Pressure, heat transfer, and/or flow rate may be varied, for example, by varying the insertion depth of a particular orifice device. By varying the insertion depth of one or more orifice devices (see FIG. 11), the pressure, heat transfer, and/or flow rate associated with the corresponding flow paths may be made equal for some or all of the heat transfer tubes to account for varying degrees of misalignment of the orifice devices within the heat transfer tubes.

Third orifice device 133 is shown located within third heat transfer tube 73 together with an alignment device 135. Alignment device 135 may be configured to align, guide, and/or position orifice device 133 within third heat transfer tube 73. In some examples, alignment device 135 may be configured to align orifice device 133 along a common longitudinal centerline with third heat transfer tube 73. Alignment device 135 is illustrated as having an approximately "C" shaped cross section, such that the ends of alignment device 135 may provide a space or gap that forms a partial flow path 137 for the fluid. Partial flow path 137 may provide a gap having width 136 through which the feedwater may flow. In some examples, alignment device 135 may comprise a self-locking design that fits over one or more threads of the orifice device. Alignment device 135 may be welded or otherwise attached to the orifice device.

Figure 15:
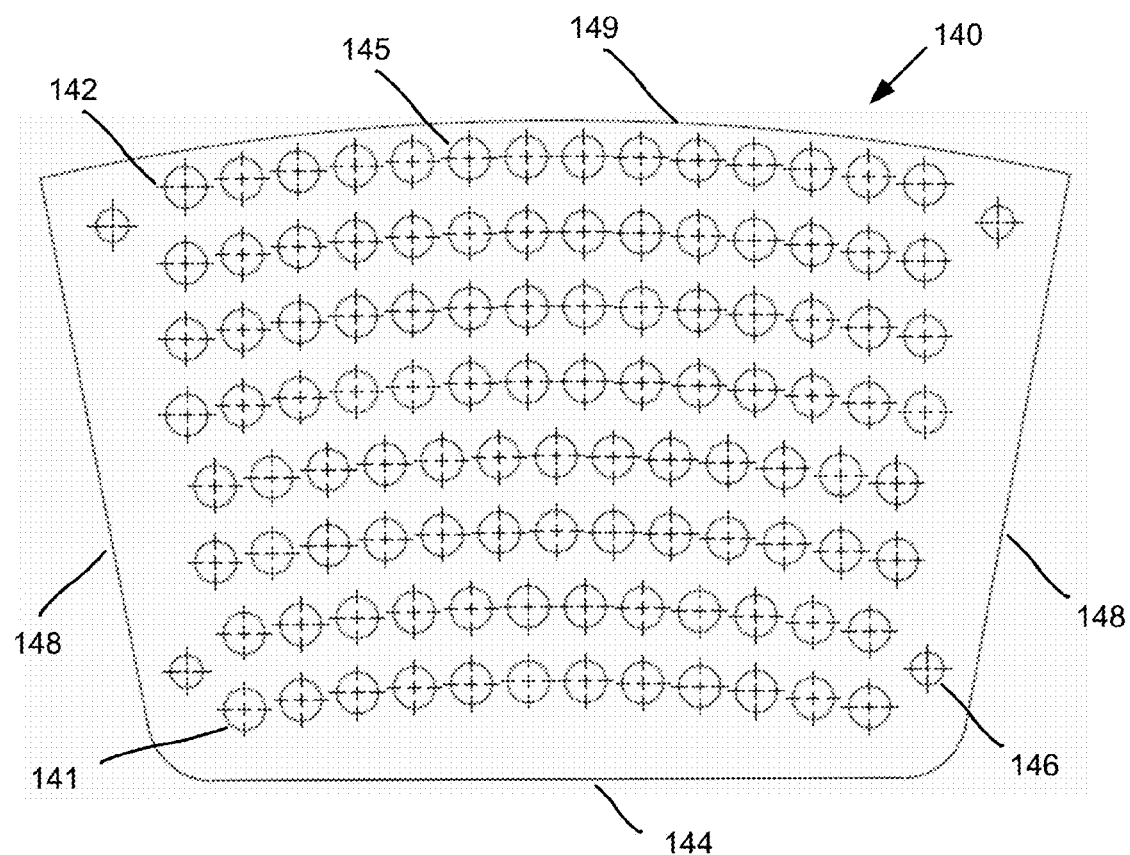
FIG. 15 illustrates an example orifice plate.

FIG. 15 illustrates an example orifice plate 140. Orifice plate 140 may comprise a plurality of through-holes 145, or perforations, configured to receive a plurality of orifice devices. An equal number of through-holes 145 may be provided for the corresponding number of orifice devices. In some examples, an equal number of through-holes 145 may be provided for a corresponding number of heat transfer tubes. One or more mounting holes 146 may also be provided in orifice plate 140. For example, the one or more mounting holes 146 may be configured to mount orifice plate 140 to a tube sheet and/or to a surrounding plenum.

Orifice plate 140 may comprise a similar layout as an adjacent tube sheet. For example, through-holes 145 may be located in an approximately similar pattern as a plurality of heat transfer tubes mounted to the tube sheet. Orifice plate 140 may comprise a number of rows and/or columns of through-holes, such as first row 141 and second row 142. Second row 142 may have more through-holes than first row 141.

Orifice plate 140 may be approximately trapezoidal in shape. For example, orifice plate 140 may comprise a first straight side 144 and a second side 149. Two non-parallel sides 148 may form the remainder of the perimeter of orifice plate 140. In some examples, orifice plate 140 may comprise a similar shape as one or more tube sheets described variously herein.

In addition to through-holes 145, orifice plate 140 may comprise one or more flow channels, such as flow channel 104 of FIG. 11. The one or more flow channels may be located intermediate to through-holes 145. In some examples, through-holes 145 may be used interchangeably as either an insertion hole for an orifice device or a flow channel depending, at least in part, on the corresponding pattern of the heat transfer tube bundle and/or the corresponding number of heat transfer tubes.

More than one orifice plate may be used in conjunction with a tube sheet. The number of through-holes in the orifice plate may comprise a fraction of the total number of heat transfer tubes associated with the tube sheet. For example, a tube sheet associated with three hundred heat transfer tubes may be located adjacent three orifice plates, each having a third, or one hundred, through-holes and/or orifice devices. In some examples, a single plenum may be associated with over three hundred heat transfer tubes and/or three hundred orifice devices. In example heat transfer systems comprising four plenums (e.g., four lower plenums), there may be in excess of one thousand heat transfer tubes and/or one thousand orifice devices.

Figure 16:
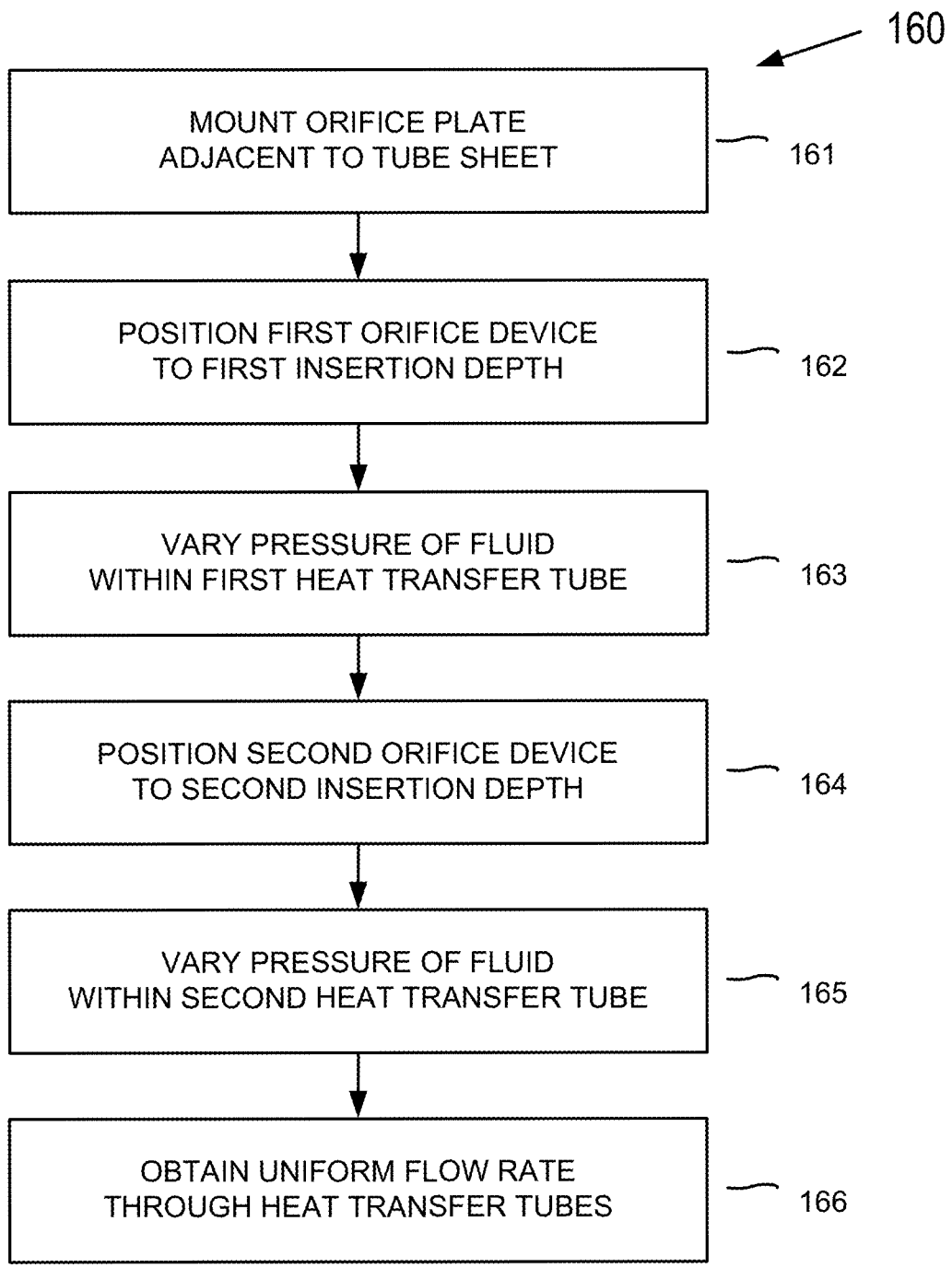
FIG. 16 illustrates an example process of installing a tube aligning orifice system.

FIG. 16 illustrates an example process 160 of installing a tube aligning orifice system. At operation 161, an orifice plate may be mounted adjacent to a tube sheet. A plurality of heat transfer tubes may be coupled to the tube sheet, and the plurality of heat transfer tubes may be configured to convey a fluid. The orifice plate may be mounted to a surrounding plenum. In some examples, the orifice plate may be mounted directly to the tube sheet. One or more orifice devices may be attached to the orifice plate either before or after mounting the orifice plate.

At operation 162, a first orifice device attached to the orifice plate may be rotated and/or otherwise positioned with respect to the orifice plate. For example, a rotation of the first orifice device may result in a first insertion depth of the first orifice device within a first heat transfer tube.

At operation 163, the insertion depth may be controlled to vary a pressure of the fluid in the first heat transfer tube. In some examples, one or more of the orifice devices may comprise a plurality of threads that provide for a number of transition steps or pressure drops of the fluid in the heat transfer tubes.

In addition to adjusting the relative insertion depth of the orifice device within the corresponding heat transfer tube, the orifice device may be removed from the orifice plate, for example, by additional rotation to the orifice device in a direction opposite to the insertion into the heat transfer tubes. In some examples, the entire orifice plate, including some or all of the attached orifice devices, may be removed from the plenum for inspection and/or maintenance of the tube bundle.

At operation 164, a second orifice device attached to the orifice device may be rotated or otherwise positioned to a second insertion depth within a second heat transfer tube. In some examples, the second insertion depth may be greater than the first insertion depth. In other examples, the second insertion depth may be less than or equal to the first insertion depth. The selected position of the heat transfer tubes may be held, locked, secured, fixed, or otherwise maintained by a plurality of securing devices.

The one or more orifice devices may comprise an external thread that is configured to mate with an internal thread of a through-hole located in the orifice plate. For example, the insertion depth of the orifice device may be varied by rotating the orifice device within the through-hole. Additionally, the orifice device may be configured such that rotation of the orifice device in a first rotational direction causes the insertion depth to increase, and a rotation of the orifice device in a second rotational direction causes the insertion depth to decrease.

In some examples, the one or more orifice devices may be pre-positioned to corresponding insertion depths within the orifice plate prior to installing the orifice plate in the plenum as a complete orifice device and orifice plate assembly. For example the orifice devices mounted on the orifice plate may be inserted into the corresponding tubes at the same time that the orifice plate is positioned and/or mounted within the plenum.

At operation 165, a pressure of the fluid in the second heat transfer tube may be varied according to the second insertion depth. In some example, an amount of the pressure drop may be determined based, at least in part, on a number of threads provided in the insertion depth. For example, the orifice device may be configured to vary the amount of the pressure drop by varying the number of threads provided in the insertion depth. Additionally, the number of threads provided in the insertion depth may be varied by rotating the orifice device within the orifice plate.

At operation 166, the pressure of the fluid within the first heat transfer tube and/or the second heat transfer tube may be varied to obtain an approximately uniform flow rate and/or heat transfer through the plurality of heat transfer tubes. The one or more orifice devices may comprise a shaft inserted within an inner tube wall of the heat transfer tubes, and an annular flow path of the feedwater may be formed between the orifice shaft and the inner tube wall.

The orifice shaft may comprise concentric threads configured to provide a spiraling annular flow path of the feedwater. Additionally, the concentric threads may be configured as incremental transition steps of the pressure drop, and the pressure drop may incrementally vary according to the number of concentric threads located within the heat transfer tube.

Figure 17:
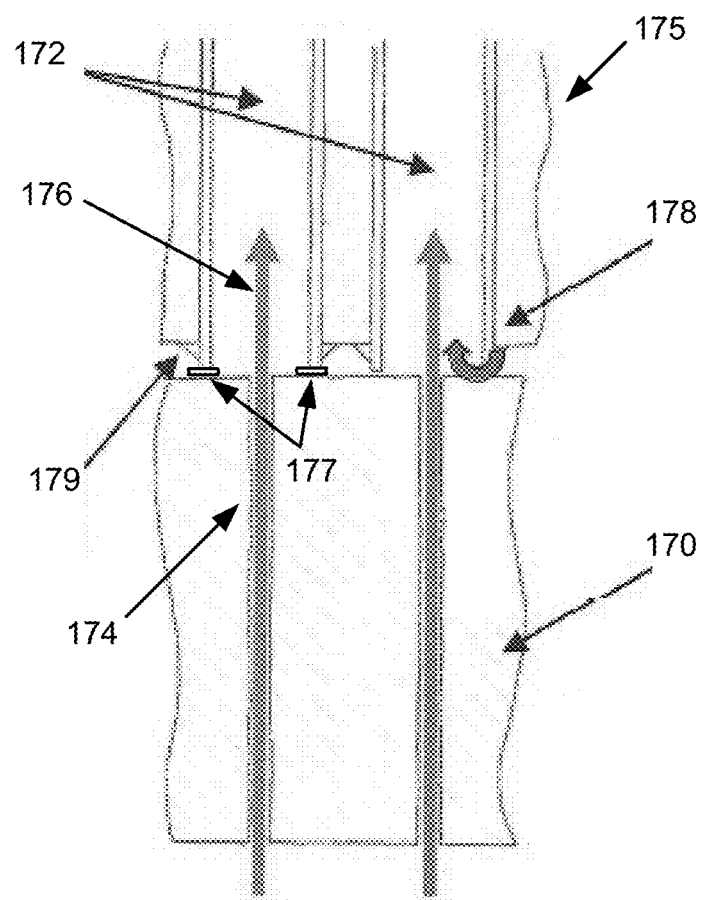
FIG. 17 illustrates an example orifice plate mounted adjacent to a plurality of heat transfer tubes.

FIG. 17 illustrates an example orifice plate 170 mounted adjacent to a plurality of heat transfer tubes 172. Heat transfer tubes 172 may be welded 179 to a tube sheet 175. Whereas various other examples illustrated herein show the placement of orifice devices within an orifice plate, orifice plate 170 may comprise a number of orifice holes 174 which are aligned with the heat transfer tubes 172 to control the flow of coolant 176 into heat transfer tubes 172. In some examples, orifice plate 170 may be seated on the ends of heat transfer tubes 172.

Orifice plate 170 may be pressed against the ends of heat transfer tubes 172 to minimize bypass flow 178 (or leakage) of coolant 176 that can occur through a gap between the heat transfer tubes 172 and orifice plate 170. In some examples, a mechanical sealing device 177, such as metal o-rings or v-seals, may be placed between the ends of heat transfer tubes 172 and orifice plate 170 to reduce and/or eliminate the gap.

Figure 18:
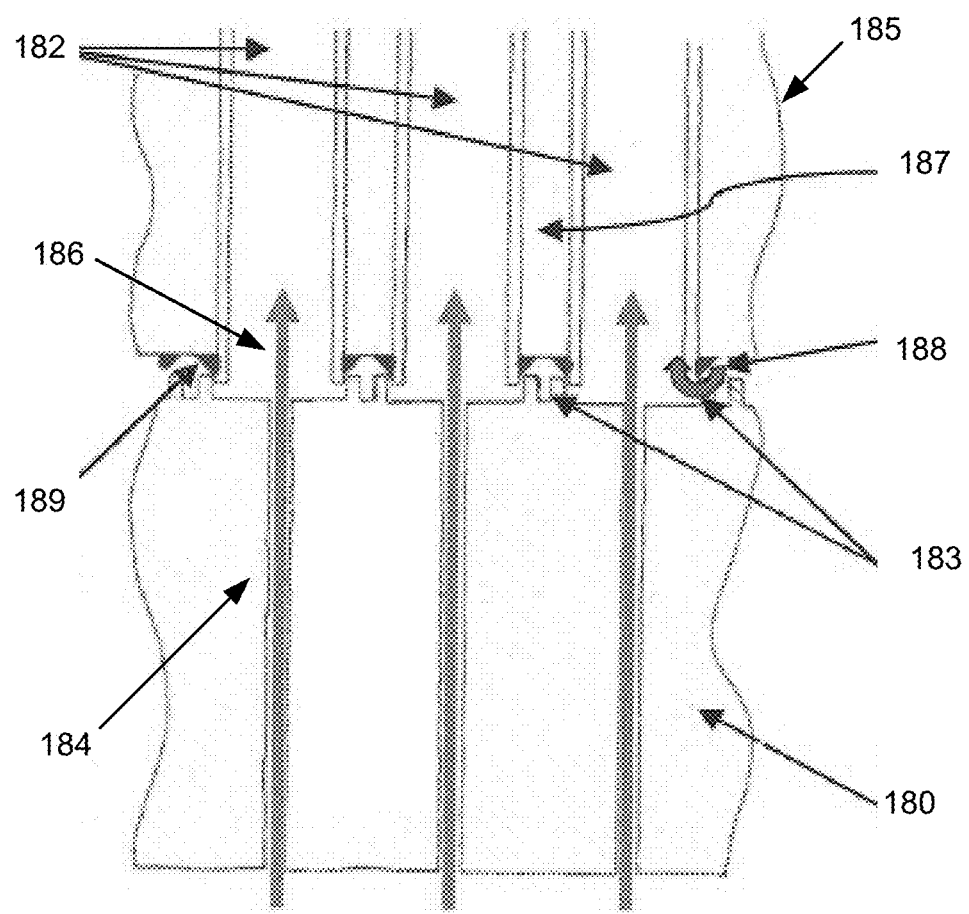
FIG. 18 illustrates an example orifice plate mounted adjacent to a tube sheet.

FIG. 18 illustrates an example orifice plate 180 mounted adjacent to a tube sheet 185. Orifice plate 180 may have a number of cylindrical stubs 183 located around each orifice hole 184 that are to fit up to the face of tube sheet 185 to limit bypass leakage 188. A ligament 187 may be located between each tube hole and/or heat transfer tube 182 in the radial direction. On the face of tube sheet 185, most of ligament 187 may be occupied by one or more welds 189.

In some examples, orifice plate 180 may be configured to bear directly on the surface of tube sheet 185 if the heat transfer tubes 182 are recessed below the surface of tube sheet 185. Heat transfer tubes 182 may be welded to tube sheet 185 with a laser weld along the tube-to-tube sheet interface. Use of laser welding in lieu of fillet welding, for example, may minimize the encroachment of the weld on ligament 187 between heat transfer tubes 182. While there may be sufficient access space to install a single orifice plate into the plenum, in some examples, a multi-plate orifice attachment system may be installed.

Figure 19:
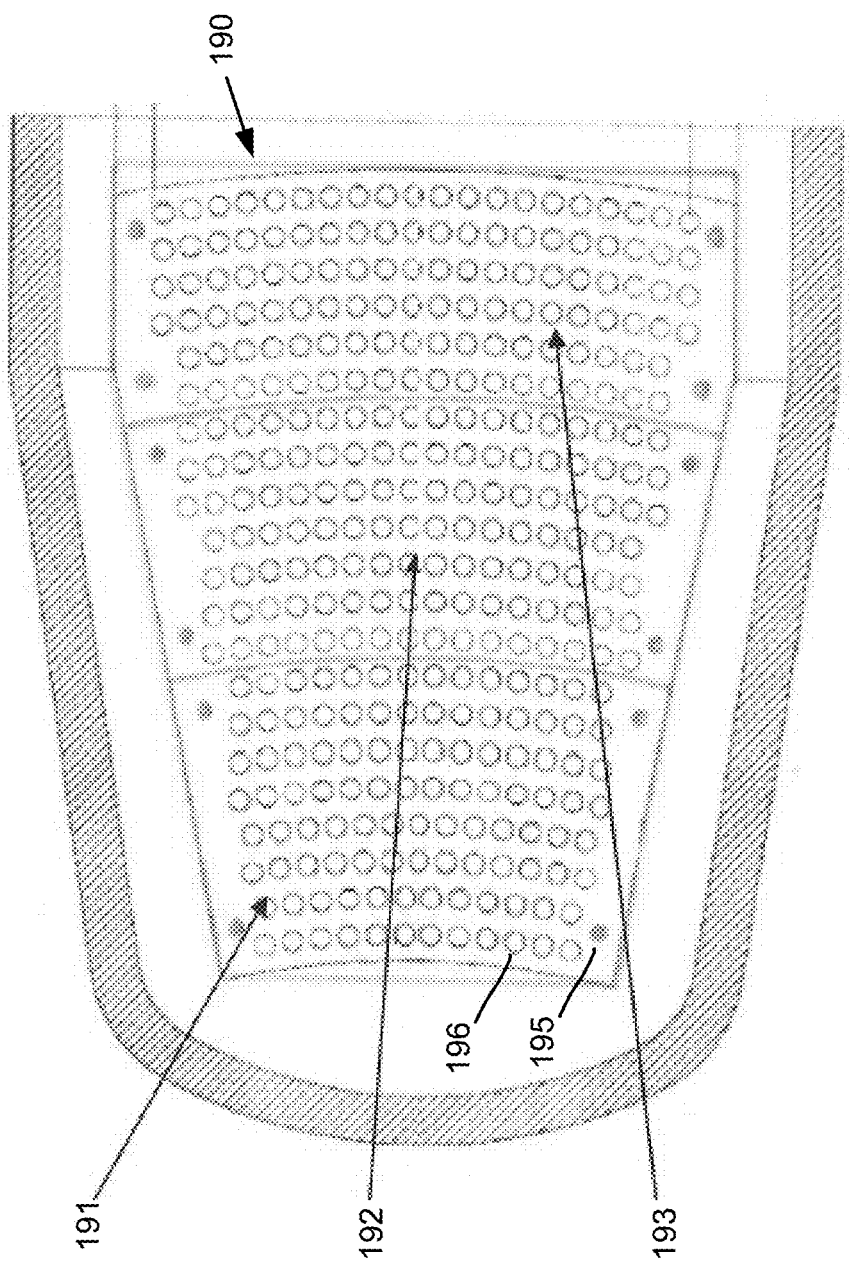
FIG. 19 illustrates an example orifice attachment system comprising multiple mounting plates.

FIG. 19 illustrates an example orifice attachment system 190 comprising multiple mounting plates, including a first plate 191, a second plate 192, and a third plate 193. Including multiple mounting plates may reduce the weight of each plate as compared to the single-plate configuration. For example, if a single mounting plate weighs 30 pounds, each of the three plates 191, 192, 193 may be sized and/or configured to weigh approximately 10 pounds each. Reduced-sized mounting plates may facilitate manual handling and/or operate to reduce the number of orifice devices that may be simultaneously installed and/or removed from the plenum. Use of one or more mounting plates will facilitate positioning and affixing the orifice devices in place without affecting the tube ends.

In some examples, the mounting plates may be separated and/or connected along one or more circumferential ligaments located between tube columns or rows, e.g., separating them along curved lines. Each mounting plate may be configured with approximately the same number of tubes as the other plates.

Dowel pins may be inserted through the mounting plate into corresponding tubes during installation to facilitate alignment. Additionally, a number of studs 195 may be used to mount the orifice plates to the tube sheet. The studs 195 may be threaded into holes and/or welded to the face of the tube sheet. In some examples, use of swage fittings may be inserted into blind tubes.

Four or more mounting holes may be located about the periphery of the tube sheet in the region outside the tube hole pattern 196 to locate studs 195 associated with each mounting plate. In some examples, the regions where mounting holes are located may be drilled to a larger diameter and plugged with a corrosion resistant material, such that the tapped attachment holes are contained entirely in corrosion resistant material. The tube sheet holes for the corrosion resistant plugs may either be drilled prior to cladding, in which case a cylindrical corrosion resistant plug is inserted, clad over, and then drilled and tapped, or may be drilled after cladding and a pre-drilled and tapped plug inserted and seal welded.

Drilling and tapping operations may be performed on the inside surface of the tube sheet. An alternative option is to drill through the thickness of the tube sheet from the outside face of the tube sheet. In this case, the plug to be inserted into the hole may be predrilled and tapped on its inner face and after installation is welded at both faces. This drilling operation could readily be performed in conjunction with drilling of the tube holes from the outside face of the tube sheet. In some examples welded studs may be welded to an inner face of the tube sheet or orifice plate by a stud gun.

As discussed previously, the orifice devices may be mounted or otherwise attached to the mounting plate prior to installation of the mounting plate in the plenum. With this approach, all of the orifice devices associated with the mounting plate may be inserted into the ends of the heat transfer tubes substantially simultaneously during installation of the mounting plate. In other examples, the mounting plate may be aligned and installed to the tube sheet prior to attaching the orifice devices to the mounting plate. The orifice devices may then be individually inserted through holes in the mounting plate into the ends of the heat transfer tubes and then attached to the mounting plate once in position.

In some examples, the orifice devices may comprise an approximately half inch larger outer diameter region which is inserted through the ends of the heat transfer tubes. The heat transfer tubes may have a slightly larger inner diameter than the larger outer diameter region of the orifice devices. In order to facilitate simultaneous insertion of the multiple flow restrictors into their respective tube ends, precision machined mating flanges may be located on the orifice devices and/or on the mounting plate in order to improve the perpendicularity of the assembled orifice devices to the mounting plate.

In other examples, the mounting plate together with integral orifice protrusions may be manufactured by three dimensional metal printing. Laser mapping of the tube locations on the face of the tube sheet may be performed to develop a solid model of the mounting plate including integral flow restrictor protrusions. This solid model may then be utilized for precision three dimensional printing of an integral orifice plate containing orifice protrusions positioned specifically based on the tube end as-built data.

The material for the orifice devices, mounting plates, and/or associated hardware may be compatible with a secondary water environment. An example material for the attachment plate and orifice devices is stainless steel, e.g., 304 or 304L stainless steel, or SB-564, UNS N06690 (Alloy 690), because of its good corrosion and erosion resistance and its compatibility with various heat transfer tube cleaning solutions, such as ethylenediaminetetraacetic acid or hydroxyacetic acid-formic acid mixtures.

The mounting plate may first be installed and aligned with the ends of the heat transfer tubes, and then individual orifice devices may be inserted through the mounting plate into the tube ends and secured in position. There are several optional methods for securing the flow restrictor to the plate after it is positioned inside the tube.

Figure 20:
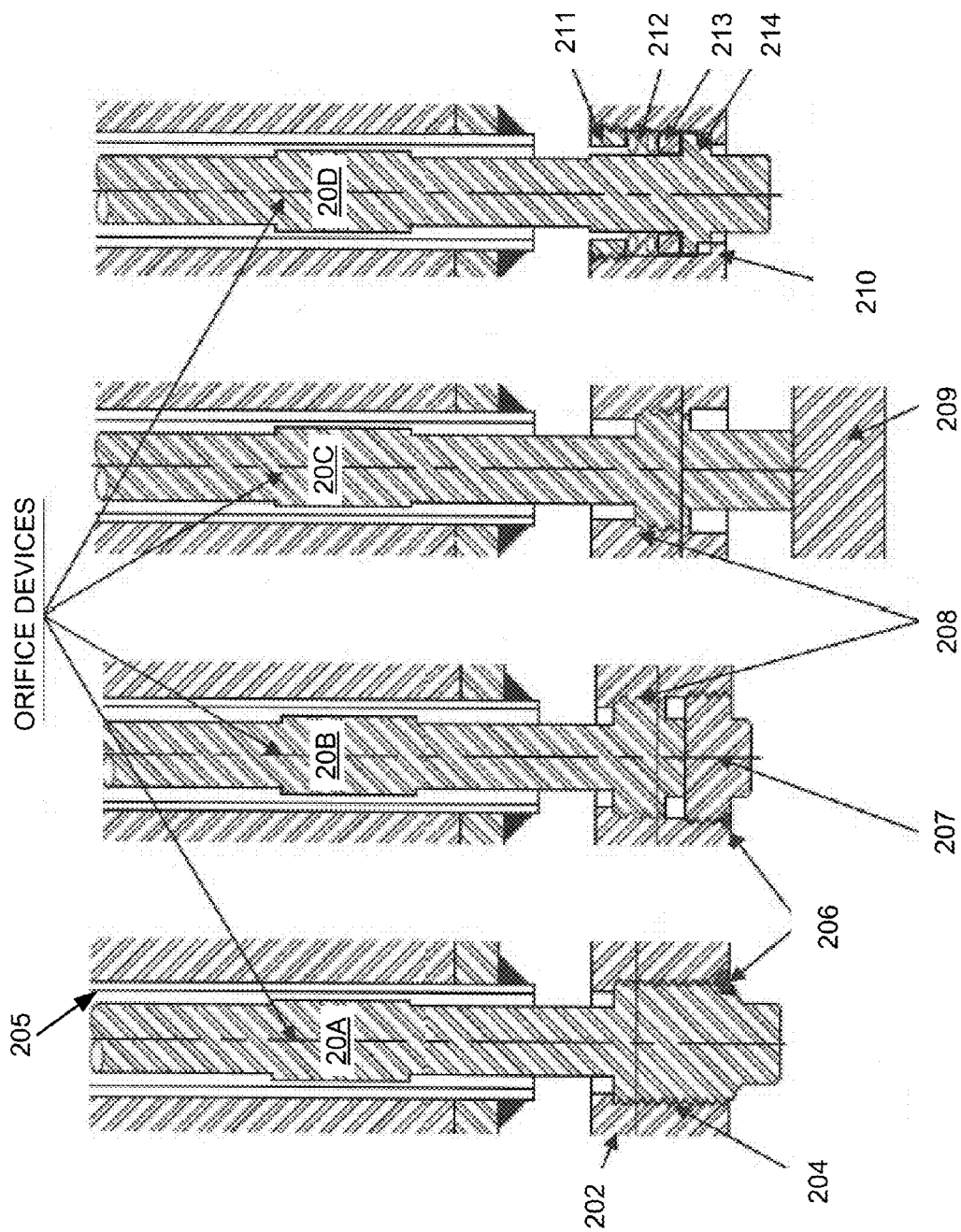
FIG. 20 illustrates four example methods for securing an orifice device in a mounting plate.

FIG. 20 illustrates four example methods for securing an orifice device in a mounting plate. A first orifice device 20A is shown illustrated as being attached to a mounting plate 202 by a threaded connection 204. Threaded connection 204 may comprise both an external threaded connection on first office device 20A and an internal threaded connection within mounting plate 202. In some examples, threaded connection 204 may be sized and/or configured to provide spacing between the external threaded connection and the internal threaded connection to allow for relatively minor repositioning and/or centering of first orifice device 20A within the corresponding heat transfer tube 205, e.g., without causing binding at threaded connection 204.

First orifice device 20A may be secured and/or locked in position to avoid inadvertent rotation and/or loosening of first orifice device 20A from mounting plate 202. In some examples, first orifice device 20A may be secured to mounting plate 202 by staking the threads and/or by application of an autogenous lock weld 206 to the thread juncture.

A second orifice device 20B is shown illustrated as being attached to a mounting plate by use of interrupted threads, or a breechlock arrangement 208. Second orifice device 20B may be inserted through the mounting plate into the tube end with the regions of external threads passing the regions of interrupted internal threads until a flange on second orifice device 20B contacts a flange on the mounting plate. Subsequently, second orifice device 20B may be rotated approximately 90 degrees to engage the external threads on second orifice device 20B with the internal threads in the mounting plate hole. The use of loose fitting flat threads (e.g., with no pitch) may be configured to hold second orifice device 20B loosely in place during assembly.

In some examples, a separate mounting piece may be used to tightly secure second orifice device 20B to the mounting plate and prevent it from rotating or loosening during operation. The separate mounting piece may comprise a backing plug 207 which may be threaded and/or tightened against the end of second orifice device 20B.

A third orifice device 20C is shown illustrated as being attached to the mounting plate by a separate mounting piece comprising a backing plate 209 which may be positioned against the end of third orifice device 20C. Use of a separate threaded plug for third orifice device 20C may comprise a threaded plug that is staked or lock welded to the backing plate 209 to prevent rotation and loosening. In some examples, use of backing plate 209 to hold third orifice device 20C in place may comprise four or more studs and/or nuts which may be used to attach third orifice device 20C to the mounting plate.

A fourth orifice device 20D is shown illustrated as being attached to the mounting plate by a spring loaded locking mechanism 210. As with one or more of the other orifice devices illustrated at FIG. 20, fourth orifice device 20D may be inserted through the mounting plate into the tube end. Two or more integral lugs 214 located on fourth orifice device 20D may be configured to pass through slots in the bottom of the mounting plate. As insertion of fourth orifice device 20D continues, the lugs 214 may compress a spring 212 and/or a spring loaded washer 213 to the point where fourth orifice device 20D may be rotated approximately 90 degrees, at which time the lugs 214 may drop into the slots in the mounting plate. Subsequently, fourth orifice device 20D may be locked in position by the spring loaded washer 213 holding the lugs 214 securely in the slots.

In some examples, a sufficient diametric clearance may be provided between the lugs 214 and the slots to permit alignment and/or centering of fourth orifice device 20D with the tube. A spring constant associated with spring 212 may be selected to be low enough to permit practical restrictor assembly (e.g., without undue manual insertion force) and high enough to provide sufficient attachment force to preclude rattling of fourth orifice device 20D during operation. A viewing slot or other position indication may be placed on the outer end of fourth orifice device 20D to permit visual confirmation of proper assembly.

The spring lock assembly 210 may be pre-assembled into each hole by placing washer 213 in the bottom of the hole, inserting spring 212 above the washer 213, and then compressing the spring 212 and locking the spring lock assembly 210 in place with a threaded retaining washer 211 that may be lock welded after assembly. Spring lock assembly 210 may be self locking and may be configured to hold the position of fourth orifice device 20D with a spring force and/or pre-loaded force, which may be provided to avoid looseness and/or reduce the potential for rattling due to flow induced vibration (FIV).

One or more of the orifice devices may be attached to the mounting plate and may be simultaneously lowered and or removed out of the tube while attached to the mounting plate. In some examples, the orifice device may be installed and/or aligned with the mounting plate first, and then inserted through the mounting plate holes and into the tube ends one at a time.

Although the orifice devices illustrated in FIG. 20 are shown as including annular type restrictors or externally-threaded annular flow restrictors, other types of orifice devices, including center orifice flow restrictors, may also be mounted to the mounting plates in similar manner. In some examples, the orifice devices may not be inserted into the tubes, rather they may be seated on the tube ends. In the event that the orifice flow devices are not inserted into the tube ends, the requirements for alignment of the mounting plate holes with the tubes may not be as critical as they are for when the orifice devices are inserted into the heat transfer tubes.

Proper seating of each orifice device with its respective tube end may assist in reducing or precluding bypass leakage flow. One or more of the above described mounting procedures may be configured to provide for adjustment of the position of the orifice device to ensure it is flush on the tube end during installation and/or operation, e.g., to account for thermal and/or mechanical bowing of the tube sheet, as well as manufacturing and assembly tolerances. The orifice device and/or mounting attachment may be configured to self-adjust the position of the orifice device during operation to accommodate tube sheet bow. For example, spring loaded locking mechanism 210 may be configured to provide for this adjustability. The spring force may be used to seat the orifice device in the mounting plate and/or against the tube end.

Figure 21:
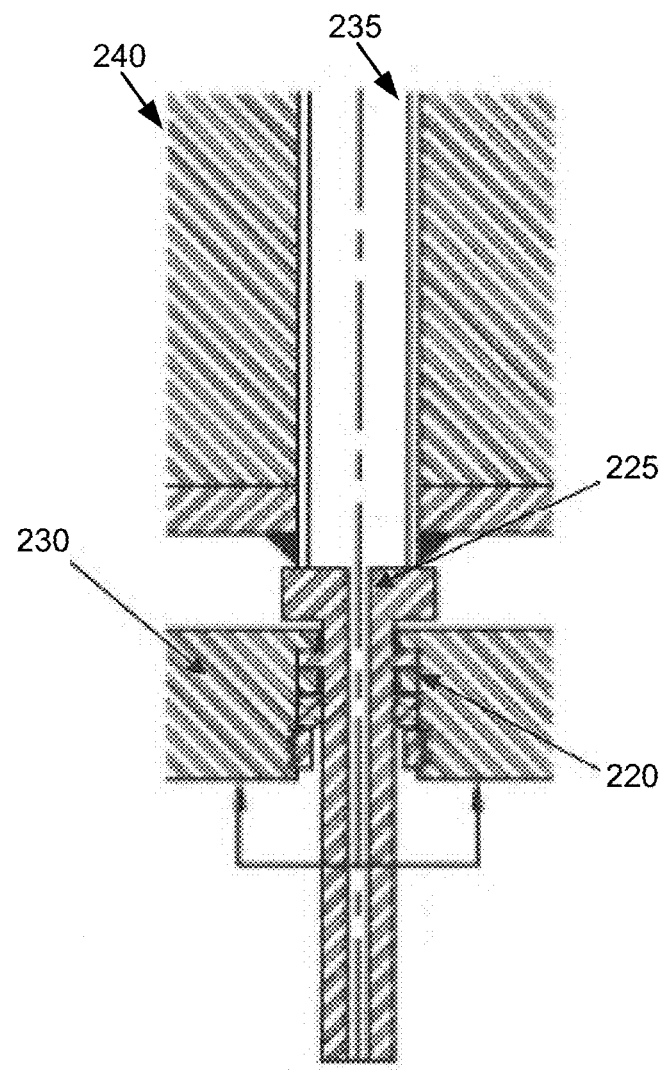
FIG. 21 illustrates a spring loaded attachment mechanism that is inverted for attaching an orifice device to a mounting plate.

FIG. 21 illustrates a spring loaded attachment mechanism 220 that may be inverted for attaching an orifice device 225 to a mounting plate 230. In some examples, orifice device 225 may comprise a center flow type orifice device. Orifice device 225 may be assembled to mounting plate 230 from the side of mounting plate 230 that faces a tube sheet 240 in order for the spring force to act in the direction to press mounting plate 230 against the end of a heat transfer tube 235. An indirect confirmation of proper seating of orifice device 225 may comprise retracting orifice device 225 a small amount to confirm proper function of spring loaded attachment mechanism 220, and/or including a dimensional check to confirm that the distance from the mounting plate 230 to the back end of orifice device 225 is within the expected range. Orifice device 225 may be attached to mounting plate 230 prior to installation of mounting plate 230 on tube sheet 240.

Figure 22:
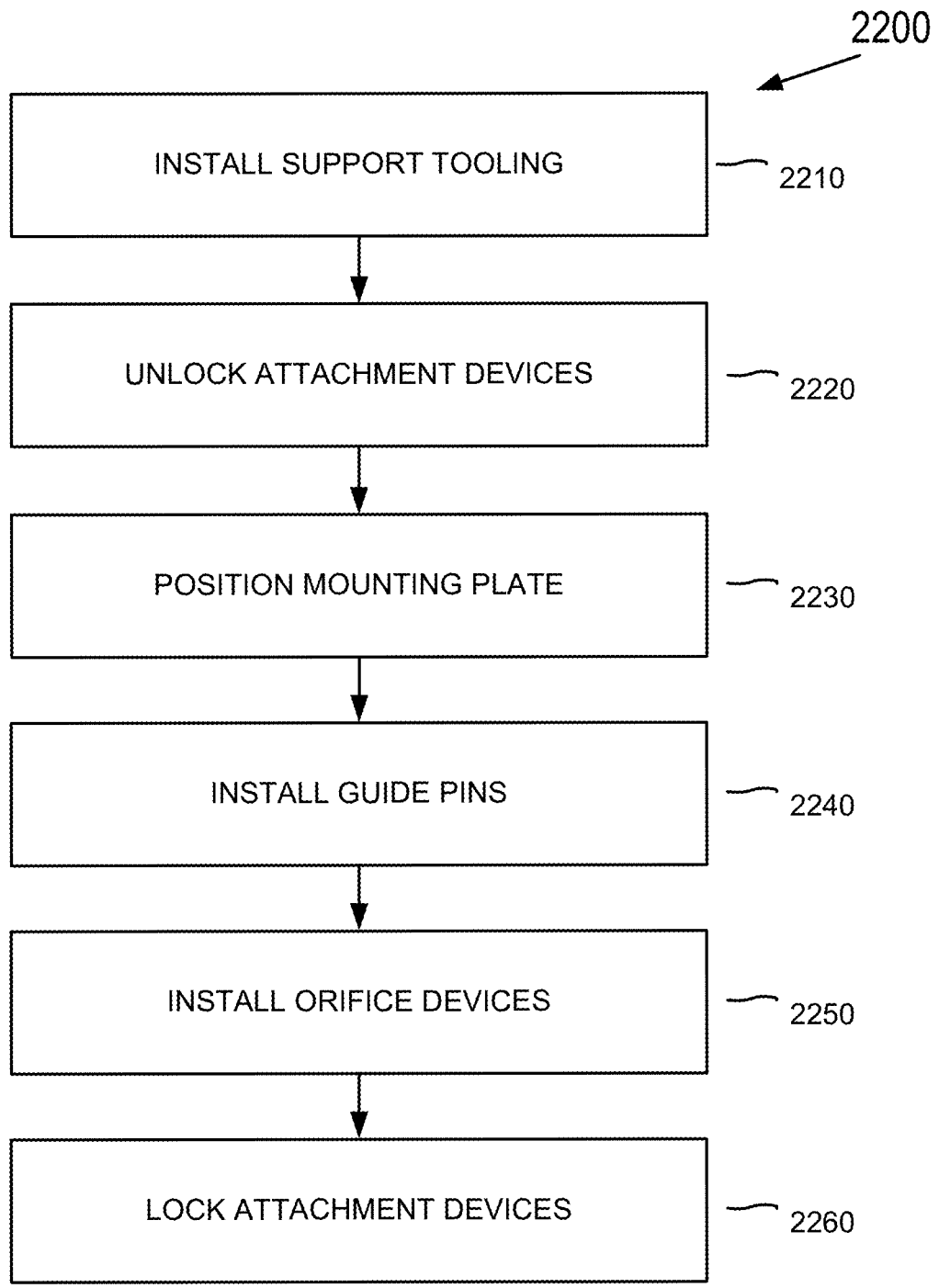
FIG. 22 illustrates an example process comprising removal, installation, and/or reinstallation operations for orifice devices.

FIG. 22 illustrates an example process 2200 comprising removal, installation, and/or reinstallation operations for orifice devices inserted into corresponding heat transfer tubes. At operation 2210, support tooling may be installed to hold a mounting plate and support transport of the mounting plate.

At operation 2220, one or more attachment devices may be unlocked. The attachment device may comprise four or more nuts for each mounting plate. After loosening and/or removing the nuts, the mounting plate may be lowered and/or removed from the plenum. In some examples, the orifice devices may still be attached to the mounting device when it is removed. Operations 2210 and 2220 may be repeated and/or performed for any additional mounting plates (e.g., for a multi-plate mounting configuration).

At operation 2230, during installation and/or reinstallation of the mounting plate, the mounting plate may be positioned over the attachment device and/or studs and loosely held in place with one or more nuts threaded onto the studs.

At operation 2240, one or more guide pins may be installed and/or inserted through the mounting plate into selected holes to align the orifice device attachment holes with the tube ends. In some examples, the mounting plate may be secured in place by tightening the nuts on the four studs. After securing the mounting plate, the guide pins may be removed.

At operation 2250, orifice devices may be installed one at a time by inserting them through the hole in the mounting plate and into the tube end, compressing the spring loaded washer, and rotating the orifice devices approximately 90 degrees into the locked position.

Operations 2230, 2240, and 2250 may be repeated and/or performed for any additional mounting plates (e.g., for a multi-plate mounting configuration).

At operation 2260, the attachment devices for the one or more mounting plates may be locked, and a final installation inspection may be performed.

Figure 23:
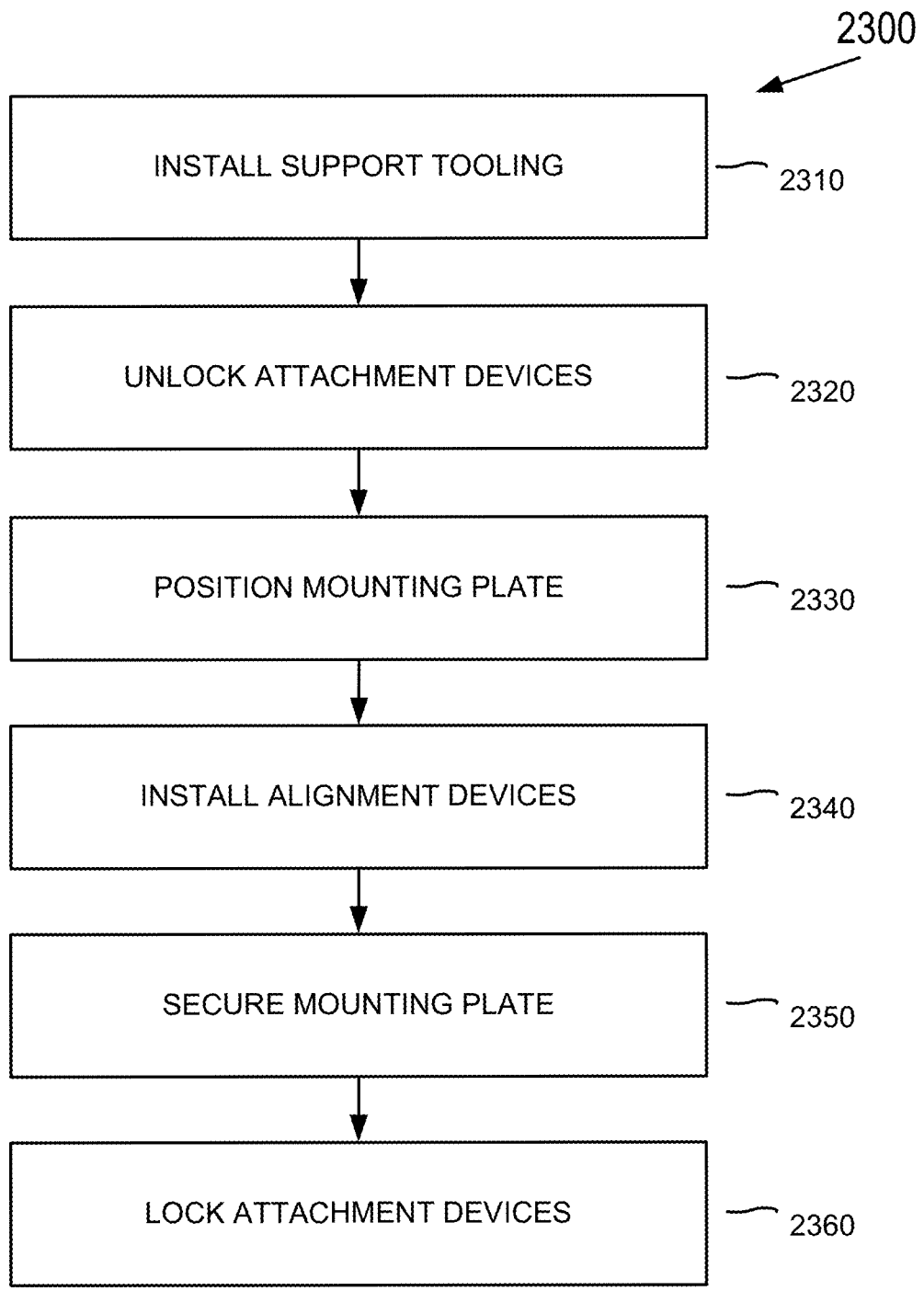
FIG. 23 illustrates a further example process comprising removal, installation, and/or reinstallation operations for orifice devices.

FIG. 23 illustrates an example process 2300 comprising removal, installation, and/or reinstallation operations for orifice devices positioned adjacent the ends of corresponding heat transfer tubes. The orifice devices may be attached to the mounting plate by one or more spring lock attachments. Additionally, the orifice devices may be attached to the mounting plate during both removal and installation/reinstallation operations.

At operation 2310, support tooling may be installed to hold the mounting plate and support transport of the mounting plate.

At operation 2320, one or more attachment devices may be unlocked. The attachment device may comprise four or more nuts for each mounting plate. After loosening and/or removing the nuts, the mounting plate may be lowered and/or removed from the plenum. In some examples, the orifice devices may still be attached to the mounting device when it is removed. Operations 2310 and 2320 may be repeated and/or performed for any additional mounting plates (e.g., for a multi-plate mounting configuration).

At operation 2330, during installation and/or reinstallation of the mounting plate, the mounting plate may be positioned over the attachment device and/or studs and loosely held in place with one or more nuts threaded onto the studs.

At operation 2340, one or more alignment devices may be installed through the mounting plate into tube sheet alignment features to align the orifice devices with the tube ends.

At operation 2350, the mounting plate may be secured in place by tightening the nuts on the studs. After securing the mounting plate, the one or more alignment devices may be removed, and verification that each orifice device is properly seated on its tube end may be performed. Operations 2330, 2340, and 2350 may be repeated and/or performed for any additional mounting plates (e.g., for a multi-plate mounting configuration).

At operation 2360, the attachment devices for the one or more mounting plates may be locked, and a final installation inspection may be performed.

Although the examples provided herein have primarily described a pressurized water reactor, it should be apparent to one skilled in the art that the examples may be applied to other types of power systems as described or with some obvious modification. For example, the examples or variations thereof may also be made operable with a boiling water reactor, sodium liquid metal reactor, pebble-bed reactor, or a reactor designed to operate in space, such as in a propulsion system with limited operational space. Whereas certain examples describe use of the helical coil steam generator in a nuclear reactor, the steam generator could also be made to operate with other types of steam generating power facilities, including gas powered and coal fired plants. Similarly, the steam generators may be configured to operate with either natural or forced circulation.

Other examples may include various nuclear reactor technologies, such as nuclear reactors that employ uranium oxides, uranium hydrides, uranium nitrides, uranium carbides, mixed oxides, and/or other types of radioactive fuel. It should be noted that examples are not limited to any particular type of reactor cooling mechanism, nor to any particular type of fuel employed to produce heat within or associated with a nuclear reaction. Any rates and values described herein are provided by way of example only. Other rates and values may be determined through experimentation such as by construction of full scale or scaled models of a nuclear reactor system.

Having described and illustrated various examples herein, it should be apparent that other examples may be modified in arrangement and detail. We claim all modifications and variations coming within the spirit and scope of the following claims.

The invention claimed is:

1. A heat transfer system comprising:
a plenum configured to provide feedwater to a plurality of heat transfer tubes;
a tube sheet configured to couple the plurality of heat transfer tubes to the plenum;
an orifice plate mounted within the plenum and located adjacent to the tube sheet; and
one or more orifice devices supported by the orifice plate and configured for insertion into one or more of the plurality of heat transfer tubes,
wherein the one or more orifice devices each comprise a cylindrical body having helical shaped threads,
wherein the insertion of the one or more orifice devices into the one or more of the plurality of heat transfer tubes determines a corresponding pressure drop of the feedwater in the heat transfer system,
wherein the orifice plate comprises a through-hole having internal threads formed thereon,
wherein the helical shaped threads of the one or more orifice devices are configured to mate with the internal threads of the through-hole located in the orifice plate, and
wherein an insertion depth of the one or more orifice devices within the heat transfer tubes is varied by rotating the one or more orifice devices within the through-hole by one or more partial or complete revolutions.

2. The heat transfer system of claim 1,
wherein the one or more orifice devices are configured such that rotation of the one or more orifice devices in a first rotational direction causes the insertion depth of the one or more orifice devices to increase, and
wherein rotation of the one or more orifice devices in a second rotational direction causes the insertion depth of the one or more orifice devices to decrease.

3. A heat transfer system comprising:
a plenum configured to provide feedwater to a plurality of heat transfer tubes;
a tube sheet configured to couple the plurality of heat transfer tubes to the plenum;
an orifice plate mounted within the plenum and located adjacent to the tube sheet; and
one or more orifice devices supported by the orifice plate and configured for insertion into one or more of the plurality of heat transfer tubes,
wherein the one or more orifice devices each comprise a cylindrical body having helical shaped threads,
wherein the insertion of the one or more orifice devices into the one or more of the plurality of heat transfer tubes determines a corresponding pressure drop of the feedwater in the heat transfer system,
wherein the helical shaped threads are received by corresponding internal threads of the orifice plate,
wherein the helical shaped threads are located on an external surface of the substantially cylindrical body of the one or more orifice devices, and
wherein an amount of the pressure drop is determined based, at least in part, on a number of the threads received by the corresponding internal threads of the orifice plate.

4. The heat transfer system of claim 3, wherein the one or more orifice devices are configured to vary the amount of the pressure drop by varying the number of helical shaped threads provided in the insertion depth.

5. The heat transfer system of claim 4, wherein the number of helical shaped threads provided in the insertion depth is varied by rotating the one or more orifice devices within the orifice plate by one or more partial or complete revolutions.

6. The heat transfer system of claim 1,
wherein the one or more orifice devices comprise a shaft inserted within an inner tube wall of the heat transfer tubes, and
wherein an approximately annular flow path of the feedwater is formed between the shaft and the inner tube wall.

7. The heat transfer system of claim 6,
wherein the helical shaped threads are configured to provide a spiraling flow path of the feedwater within the heat transfer tubes.

8. The heat transfer system of claim 6,
wherein the helical shaped threads are configured to incrementally vary the pressure drop within the heat transfer tubes according to a number of the helical shaped threads inserted within the heat transfer tubes.

* * * * *